United States Patent
Kuwajima et al.

(10) Patent No.: US 11,312,115 B2
(45) Date of Patent: Apr. 26, 2022

(54) LAYERED BODY AND TUBE

(71) Applicant: DAIKIN INDUSTRIES, LTD., Osaka (JP)

(72) Inventors: Yuuki Kuwajima, Osaka (JP); Yukinori Kamiya, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/054,858

(22) PCT Filed: Apr. 17, 2019

(86) PCT No.: PCT/JP2019/016489
§ 371 (c)(1),
(2) Date: Nov. 12, 2020

(87) PCT Pub. No.: WO2019/220850
PCT Pub. Date: Nov. 21, 2019

(65) Prior Publication Data
US 2021/0213712 A1 Jul. 15, 2021

(30) Foreign Application Priority Data
May 14, 2018 (JP) .............................. JP2018-092941
Jun. 13, 2018 (JP) .............................. JP2018-112536

(51) Int. Cl.
*B32B 27/08* (2006.01)
*B32B 1/08* (2006.01)
*B32B 27/30* (2006.01)
*B32B 27/34* (2006.01)
*F16L 9/12* (2006.01)

(52) U.S. Cl.
CPC ................ *B32B 27/08* (2013.01); *B32B 1/08* (2013.01); *B32B 27/304* (2013.01); *B32B 27/34* (2013.01); *F16L 9/121* (2013.01); *B32B 2597/00* (2013.01)

(58) Field of Classification Search
CPC ...... B32B 27/08; B32B 2597/00; B32B 27/34; B32B 27/304; B32B 1/08; F16L 9/121
See application file for complete search history.

(56) References Cited

U.S. PATENT DOCUMENTS

| | | | |
|---|---|---|---|
| 2004/0191440 A1 | 9/2004 | Funaki et al. | |
| 2007/0026177 A1 | 2/2007 | Kitahara et al. | |
| 2009/0202759 A1* | 8/2009 | O'Brien | B32B 27/30 428/35.2 |
| 2009/0246435 A1* | 10/2009 | Shimono | B32B 1/02 428/36.91 |
| 2009/0291243 A1* | 11/2009 | Kitahara | B32B 27/34 428/36.91 |
| 2019/0210339 A1 | 7/2019 | Kuwajima et al. | |

FOREIGN PATENT DOCUMENTS

| | | |
|---|---|---|
| EP | 1 859 934 A1 | 11/2007 |
| JP | 07-266501 A | 10/1995 |
| JP | 2004-301247 A | 10/2004 |
| JP | 2007-015364 A | 1/2007 |
| JP | 2010-030276 A | 2/2010 |
| JP | 2015-231717 A | 12/2015 |
| WO | 2018/047477 A1 | 3/2018 |

OTHER PUBLICATIONS

International Preliminary Report on Patentability with a Translation of Written Opinion in International Application No. PCT/JP2019/016489, dated Nov. 17, 2020.
International Search Report for PCT/JP2019/016489 dated Jul. 23, 2019 [PCT/ISA210].
Extended European Search Report dated Jan. 7, 2022 in Application No. 19803026.4.

* cited by examiner

*Primary Examiner* — Michael C Miggins
(74) *Attorney, Agent, or Firm* — Sughrue Mion, PLLC

(57) ABSTRACT

A laminate including: (A) a layer containing a perfluororesin, (B) a layer containing a polymer having a chlorotrifluoroethylene unit, and (C) a layer containing a non-fluorinated polymer. Also disclosed is a tube including the laminate.

6 Claims, No Drawings

LAYERED BODY AND TUBE

CROSS REFERENCE TO RELATED APPLICATIONS

This application is a National Stage of International Application No. PCT/JP2019/016489 filed Apr. 17, 2019, claiming priority based on Japanese Patent Application No. 2018-092941 filed May 14, 2018 and Japanese Patent Application No. 2018-112536 filed Jun. 13, 2018.

TECHNICAL FIELD

The present disclosure relates to a laminate and a tube.

BACKGROUND ART

To date, fluororesins are used as materials for forming a tube for transferring a chemical solution or fuel. For example, Patent Literature 1 proposes a laminate comprising a chlorotrifluoroethylene copolymer layer (C) and a fluorine-free organic material layer (K), wherein the chlorotrifluoroethylene copolymer has a melt flow rate of 15.0 to 40.0 (g/10 min) and contains 15 to 25 mol % of chlorotrifluoroethylene units relative to all monomer units.

RELATED ART

Patent Document

Patent Document 1: Japanese Patent Laid-Open No. 2010-30276

SUMMARY OF THE INVENTION

Problem to be Solved by the Invention

An object of the present disclosure is to provide a laminate having a surface with a large contact angle, and excellent fuel barrier properties and moisture barrier properties, and comprising firmly adhered layers.

Means for Solving the Problem

The present disclosure provides a laminate comprising: (A) a layer containing a perfluororesin, (B) a layer containing a polymer having a chlorotrifluoroethylene unit, and (C) a layer containing a non-fluorinated polymer.

In the laminate of the present disclosure, the ratio of the melt flow rate (a) of the perfluororesin to the melt flow rate (b) of the polymer having a chlorotrifluoroethylene unit, a/b, is preferably 0.3 to 3.3.

In the laminate of the present disclosure, the perfluororesin is preferably a tetrafluoroethylene/perfluoro(alkyl vinyl ether) copolymer.

In the laminate of the present disclosure, the perfluororesin is preferably a tetrafluoroethylene/hexafluoropropylene copolymer.

In the laminate of the present disclosure, the polymer having a chlorotrifluoroethylene unit preferably has a reactive functional group.

In the laminate of the present disclosure, the non-fluorinated polymer is preferably a non-fluorinated elastomer.

In the laminate of the present disclosure, the non-fluorinated polymer is preferably a non-fluorinated resin.

Preferably, in the laminate of the present disclosure, the perfluororesin is a tetrafluoroethylene/perfluoro(alkyl vinyl ether) copolymer, the polymer having a chlorotrifluoroethylene unit has a reactive functional group, and the non-fluorinated polymer is a non-fluorinated elastomer.

Preferably, in the laminate of the present disclosure, the perfluororesin is a tetrafluoroethylene/hexafluoropropylene copolymer, the polymer having a chlorotrifluoroethylene unit has a reactive functional group, and the non-fluorinated polymer is a polyamide-based resin.

According to the present disclosure, a tube comprising the laminate is also provided.

Effects of Invention

The present disclosure can provide a laminate having a surface with a large contact angle, and excellent fuel barrier properties and moisture barrier properties, and comprising firmly adhered layers.

DESCRIPTION OF EMBODIMENTS

Specific embodiments of the present disclosure will now be described in detail below, but the present disclosure is not limited to the following embodiments.

The laminate of the present disclosure has (A) a layer containing a perfluororesin, (B) a layer containing a polymer having a chlorotrifluoroethylene [CTFE] unit, and (C) a layer containing a non-fluorinated polymer.

Preferably, in the laminate of the present disclosure, the layer (A), the layer (B), and the layer (C) are laminated in this order, the layer (A) and the layer (B) are directly adhered, and the layer (B) and the layer (C) are directly adhered. The laminate of the present disclosure may further have a layer containing a non-fluorinated polymer different from that in the layer (C) on the other side of the layer (C) than the layer (B) side, and a reinforcing yarn layer may be provided between the layer (C) and the layer containing a different non-fluorinated polymer. Of the two outermost surfaces of the laminate, one outermost surface may be the layer (C) or the layer containing a non-fluorinated polymer different from that in the layer (C). Also, one of the two outermost surfaces of the laminate is preferably the layer (A). In the present disclosure, the outermost surface means an exposed surface of the laminate.

When the laminate of the present disclosure has such a configuration, the layer (A) and the layer (B) as well as the layer (B) and the layer (C) are firmly adhered, thus the laminate of the present disclosure has excellent fuel resistance and chemical solution resistance and, at the same time, excellent fuel barrier properties and moisture barrier properties, and yet the contact angle of the layer (A) as the outermost surface is large. Accordingly, even when fuel or a chemical solution comes into contact with the layer (A) as the outermost surface, the laminate unlikely undergoes interlayer delamination and has excellent impact resistance and strength; in addition, neither fuel nor a chemical solution likely passes through the laminate, and it is easy to remove fuel and a chemical solution by washing the outermost surface.

In the laminate of the present disclosure, the ratio of the melt flow rate (a) of the perfluororesin forming the layer (A) and the melt flow rate (b) of the polymer having a CTFE unit forming the layer (B), a/b, is preferably 0.3 to 3.3, and more preferably 0.3 to 2.0. When the ratio a/b is within the above range, the layer (A) and the layer (B) are more firmly adhered without impairing a large contact angle as well as excellent fuel barrier properties and moisture barrier properties.

In the present disclosure, the melt flow rate (MFR) is measured in accordance with ASTM D1238 and is a value of the mass (g/10 min) of a polymer flowing out from a nozzle having an inner diameter of 2 mm and a length of 8 mm per 10 minutes at a measurement temperature predetermined according to the kind of fluoropolymer (for example, 372° C. for PFA or FEP and 297° C. for ETFE of a polymer having a CTFE unit) under a load predetermined according to the kind of fluoropolymer (for example, 5 kg for PFA, FEP, ETFE, and a polymer having a CTFE unit), using a melt indexer (manufactured by Yasuda Seiki Seisakusho Ltd.).

Next, materials for forming the respective layers will be described.

1. Layer (A)

The layer (A) contains a perfluororesin. Since the layer (A) contains a perfluororesin, the laminate of the present disclosure has excellent fuel resistance and chemical solution resistance, and also has a surface having a large contact angle, which leads to ease of removing fuel and a chemical solution by washing.

In the present disclosure, the perfluororesin is a resin consisting of a perfluoropolymer in which monovalent atoms bonded to carbon atoms that constitute the main chain of the polymer are all fluorine atoms. However, in addition to monovalent atoms (fluorine atoms), groups such as an alkyl group, a fluoroalkyl group, an alkoxy group, and a fluoroalkoxy group may be bonded to the carbon atoms that constitute the main chain of the polymer. An atom other than a fluorine atom may be present in a polymer end group, i.e., a group that terminates the polymer chain. The polymer end group is usually a group derived from a polymerization initiator or a chain transfer agent used in a polymerization reaction. Accordingly, the perfluororesin does not encompass, for example, a polymer containing a monomer unit having hydrogen atom bonded to a carbon atom that is incorporated into the main chain of the polymer, such as an ethylene/tetrafluoroethylene copolymer, or a polymer containing a monomer unit having a chlorine atom bonded to a carbon atom that is incorporated into the main chain of the polymer, such as a polymer having a CTFE unit.

In the present disclosure, the perfluororesin is a partially crystalline fluoropolymer, and is not a fluoroelastomer but a fluoroplastic. The perfluororesin has a melting point and thermoplasticity, and may be melt-fabricable or non melt-processible.

The perfluororesin preferably has melt-fabricability. In the present disclosure, melt-fabricability means that the polymer can be melted and processed using conventional processing devices such as an extruder and an injection molding machine. Accordingly, the melt-fabricable perfluororesin usually has a melt flow rate of 0.01 to 500 g/10 min as measured by the measurement method described below. The melt flow rate of the perfluororesin is preferably 1 to 100 g/10 min, and more preferably 1.5 to 50 g/10 min.

The perfluororesin is preferably at least one selected from the group consisting of a tetrafluoroethylene [TFE]/perfluoro(alkyl vinyl ether) [PAVE] copolymer [PFA] and a TFE/hexafluoropropylene [HFP] copolymer [FEP] in view of obtaining even better fuel resistance and chemical solution resistance and also a larger surface contact angle.

As PAVE, perfluoro(alkyl vinyl ether) represented by $CF_2=CF-ORf^1$ (wherein $Rf^1$ represents a perfluoroalkyl group having 1 to 8 carbon atoms) is preferable, and perfluoro(alkyl vinyl ether) represented by $CF_2=CF-ORf^3$ (wherein $Rf^3$ represents a perfluoroalkyl group having 1 to 5 carbon atoms) is more preferable. Examples of PAVE include perfluoro(methyl vinyl ether) [PMVE], perfluoro(ethyl vinyl ether) [PEVE], perfluoro(propyl vinyl ether) [PPVE], and perfluoro(butyl vinyl ether). In particular, at least one selected from the group consisting of PMVE, PEVE, and PPVE is more preferable, and PPVE is particularly preferable.

PFA is preferably, but not limited to, a copolymer having a molar ratio of a TFE unit to a PAVE unit (TFE unit/PAVE unit) of 70/30 or more and less than 99/1. The molar ratio (TFE unit/PAVE unit) is more preferably 70/30 or more and 98.9/1.1 or less, and even more preferably 80/20 or more and 98.9/1.1 or less. When the amount of the TFE unit is excessively small, the mechanical properties tend to be impaired, and when excessively large, there is a tendency that the melting point is excessively increased to impair moldability. PFA may be a copolymer consisting solely of a TFE unit and a PAVE unit, and, also, is preferably a copolymer which includes 0.1 to 10 mol % of the monomer unit derived from a monomer copolymerizable with TFE and PAVE, and 90 to 99.9 mol % of the TFE unit and the PAVE unit in total. Examples of the monomer copolymerizable with TFE and PAVE include HFP, a vinyl monomer represented by $CF_2=CF(CF_2)_nZ^1$ (wherein $Z^1$ represents a hydrogen atom, a fluorine atom, or a chlorine atom, and n represents an integer of 2 to 10), and an alkyl perfluorovinyl ether derivative represented by $CF_2=CF-OCH_2-Rf^2$ (wherein $Rf^2$ represents a perfluoroalkyl group having 1 to 5 carbon atoms).

In the present disclosure, the content of each monomer unit of the polymer can be calculated by suitably combining NMR, FT-IR, an elemental analysis, and an X-ray fluorescence analysis according to the kind of monomer.

The melting point of PFA is preferably 180° C. or higher and lower than 323° C., more preferably 230 to 320° C., even more preferably 280 to 320° C., particularly preferably 290 to 310° C., and most preferably 295 to 305° C.

In the present disclosure, the melting point is the temperature corresponding to the maximum value in the heat-of-fusion curve obtained when the temperature is raised at a rate of 10° C./min using a differential scanning calorimeter [DSC].

The MFR of PFA is preferably 1 to 500 g/10 min, and more preferably 1 to 50 g/10 min.

The initial pyrolysis temperature of PFA is preferably 380° C. or higher, more preferably 400° C. or higher, and even more preferably 410° C. or higher.

In the present disclosure, the initial pyrolysis temperature is a temperature when the weight reduction of a sample reaches 1% by mass by heating 10 mg of the sample from room temperature at a temperature-increasing rate of 10° C./min using a thermogravimeter-differential thermal analyzer [TG-DTA].

FEP is preferably, but not limited to, a copolymer having a molar ratio of a TFE unit to an HFP unit (TFE unit/HFP unit) of 70/30 or more and less than 99/1. The molar ratio (TFE unit/HFP unit) is more preferably 70/30 or more and 98.9/1.1 or less, and even more preferably 80/20 or more and 98.9/1.1 or less. When the amount of the TFE unit is excessively small, the mechanical properties tend to be impaired, and when excessively large, there is a tendency that the melting point is excessively increased to impair moldability. FEP may be a copolymer consisting solely of a TFE unit and an HFP unit, and, also, is preferably a copolymer which includes 0.1 to 10 mol % of the monomer unit derived from a monomer copolymerizable with TFE and HFP, and 90 to 99.9 mol % of the TFE unit and the HFP unit in total. Examples of the monomer copolymerizable with TFE and HFP include PAVE and an alkyl perfluorovinyl ether derivative.

The melting point of FEP is preferably 150° C. or higher and lower than 323° C., more preferably 200 to 320° C., even more preferably 240 to 300° C., and particularly preferably 240 to 290° C.

The MFR of FEP is preferably 1 to 500 g/10 min, more preferably 1 to 50 g/10 min, and even more preferably 10 to 50 g/10 min.

The initial pyrolysis temperature of FEP is preferably 360° C. or higher, more preferably 380° C. or higher, and even more preferably 390° C. or higher.

The water contact angle of the layer (A) is preferably 105 to 135°, more preferably 110 to 130°, and even more preferably 110 to 125°. When the water contact angle of the layer (A) is within the above range, it is easy to remove fuel or a chemical solution adhered to the layer (A) by washing the layer (A). The water contact angle is a value measured with a water contact angle meter CA-A manufactured by Kyowa Interface Science Co., Ltd.

The layer (A) may further contain an electroconductive filler. When the electroconductive filler is contained, it is possible to prevent build-up of static electricity resulting from, for example, friction between fuel or a chemical solution and the laminate of the present disclosure, and thus prevent fire or explosion that may occur due to electrostatic discharge, or cracks or holes in the laminate of the present disclosure and fuel leakage resulting therefrom.

The electroconductive filler is not limited, and examples include powders of electroconductive simple substances or fibers of electroconductive simple substances such as metal and carbon; powders of electroconductive compounds such as zinc oxide; and powders having the surface which has been subjected to electroconductive treatment.

The powders of electroconductive simple substances or the fibers of electroconductive simple substances are not limited, and examples include metal powders of copper, nickel, and the like; metal fibers of iron, stainless steel, and the like; and carbon black, carbon fiber, carbon fibril described in, for example, Japanese Patent Laid-Open No. 3-174018, carbon nanotube, and carbon nanohorn.

The powders having the surface which has been subjected to electroconductive treatment are powders obtained by performing electroconductive treatment on the surface of non-electroconductive powders such as glass beads and titanium oxide. A method for the electroconductive treatment is not limited, and examples include metal sputtering and electroless plating. Among the electroconductive fillers described above, carbon black is advantageous in view of economy and is thus preferably used.

The content of the electroconductive filler is suitably selected according to the kind of perfluororesin, the electroconductive performance required of a laminate, the molding conditions, and the like, and is preferably 1 to 30 parts by mass based on 100 parts by mass of the perfluororesin. A more preferable lower limit is 5 parts by mass, and a more preferable upper limit is 20 parts by mass.

In addition to the above electroconductive filler, the layer (A) may contain various additives, e.g., stabilizers such as heat stabilizers, reinforcing agents, fillers, UV absorbers, and pigments as long as the object of the present disclosure is not impaired. Such additives can increase the properties of the layer (A), such as thermal stability, surface hardness, abrasion resistance, electrostatic properties, and weather resistance.

2. Layer (B)

The layer (B) contains a polymer having a CTFE unit. Since the layer (B) contains a polymer having a CTFE unit, the laminate of the present disclosure has excellent fuel barrier properties and moisture barrier properties, and also the layers are firmly adhered.

The polymer having a CTFE unit is preferably at least one selected from the group consisting of polychlorotrifluoroethylene [PCTFE] and a CTFE copolymer, and more preferably at least one selected from the group consisting of PCTFE, a CTFE/TFE copolymer, and an ethylene/CTFE copolymer.

The CTFE copolymer is preferably a copolymer containing a CTFE unit and a unit derived from at least one monomer selected from the group consisting of TFE, HFP, PAVE, vinylidene fluoride (VdF), vinyl fluoride, hexafluoroisobutene, a monomer represented by the formula: $CH_2=CX^1(CF_2)_nX^2$ (wherein $X^1$ is H or F, $X^2$ is H, F, or Cl, and n is an integer of 1 to 10), ethylene, propylene, 1-butene, 2-butene, vinyl chloride, and vinylidene chloride.

The CTFE copolymer is more preferably at least one selected from the group consisting of an ethylene/CTFE copolymer and a copolymer containing a CTFE unit and a unit derived from at least one monomer selected from the group consisting of TFE, HFP, and PAVE.

The ethylene/CTFE copolymer (ECTFE) is a copolymer containing an ethylene unit and a CTFE unit. Preferably, the ethylene unit is 46 to 52 mol %, and the CTFE unit is 54 to 48 mol %, based on the total of the ethylene unit and the CTFE unit. ECTFE may be a binary copolymer composed solely of an ethylene unit and a CTFE unit, and may further contain a polymerization unit based on a monomer copolymerizable with ethylene and CTFE (for example, a fluoroalkyl vinyl ether (PAVE) derivative).

The content of a polymerization unit based on a monomer copolymerizable with ethylene and CTFE is preferably 0.01 to 5 mol % based on the total of the ethylene unit, the CTFE unit, and the polymerization unit based on the copolymerizable monomer.

The MFR of ECTFE is preferably 0.01 to 100 g/10 min. The MFR of ECTFE is measured at a temperature of 230° C. under a load of 2.16 kg.

The CTFE copolymer is particularly preferably a copolymer containing a CTFE unit, a TFE unit, and a monomer (α) unit derived from a monomer (α) copolymerizable therewith.

The monomer (α) is not limited as long as it is a monomer copolymerizable with CTFE and TFE, and examples include ethylene (Et), VdF, perfluoro(alkyl vinyl ether) [PAVE] represented by $CF_2=CF-ORf^1$ (wherein $Rf^1$ is a perfluoroalkyl group having 1 to 8 carbon atoms), a vinyl monomer represented by $CX^3X^4=CX^5(CF_2)_nX^6$ (wherein $X^3$, $X^4$, and $X^5$ are the same or different and a hydrogen atom or a fluorine atom; $X^6$ is a hydrogen atom, a fluorine atom, or a chlorine atom; n is an integer of 1 to 10), and an alkyl perfluorovinyl ether derivative represented by $CF_2=CF-OCH_2-Rf^2$ (wherein $Rf^2$ is a perfluoroalkyl group having 1 to 5 carbon atoms). In particular, at least one selected from the group consisting of PAVE, the vinyl monomer, and the alkyl perfluorovinyl ether derivative is preferable, and at least one selected from the group consisting of PAVE and HFP is more preferable.

PAVE is preferably perfluoro(alkyl vinyl ether) represented by $CF_2=CF-ORf^3$ (wherein $Rf^3$ represents a perfluoroalkyl group having 1 to 5 carbon atoms), such as perfluoro(methyl vinyl ether) [PMVE], perfluoro(ethyl vinyl ether) [PEVE], perfluoro(propyl vinyl ether) [PPVE], and perfluoro (butyl vinyl ether), more preferably at least one selected from the group consisting of PMVE, PEVE, and PPVE, and even more preferably PPVE.

In the alkyl perfluorovinyl ether derivative, $Rf^2$ is preferably a perfluoroalkyl group having 1 to 3 carbon atoms, and more preferably $CF_2=CF-OCH_2-CF_2CF_3$.

As for the ratio of the CTFE unit to the TFE unit in the CTFE copolymer, preferably the CTFE unit is 15 to 90 mol %, and the TFE unit is 85 to 10 mol %. More preferably, the CTFE unit is 20 to 90 mol %, and the TFE unit is 80 to 10 mol %. A CTFE copolymer comprising 15 to 25 mol % of the CTFE unit and 85 to 75 mol % of the TFE unit is also preferable.

The CTFE copolymer preferably has 90 to 99.9 mol % of the CTFE unit and the TFE unit in total and 0.1 to 10 mol % of the monomer (a) unit. When the monomer (a) unit is less than 0.1 mol %, moldability, environmental stress crack resistance, and fuel crack resistance are likely poor, and when exceeding 10 mol %, fuel barrier properties, heat resistance, and mechanical properties tend to be poor.

The CTFE copolymer is particularly preferably a CTFE/TFE/PAVE copolymer.

Examples of PAVE in the CTFE/TFE/PAVE copolymer include perfluoro(methyl vinyl ether) [PMVE], perfluoro(ethyl vinyl ether) [PEVE], perfluoro(propyl vinyl ether) [PPVE], and perfluoro(butyl vinyl ether). In particular, at least one selected from the group consisting of PMVE, PEVE, and PPVE is preferable, and PPVE is more preferable. In the CTFE/TFE/PAVE copolymer, the PAVE unit is preferably 0.5 mol % or more and preferably 5 mol % or less, based on all monomer units.

The polymer having a CTFE unit such as a CTFE/TFE/PAVE copolymer may have a reactive functional group. When the polymer having a CTFE unit has a reactive functional group, the laminate of the present disclosure has a large contact angle and excellent fuel barrier properties and moisture barrier properties, and, at the same time, the layer (A) and the layer (B) are more firmly adhered. The polymer having a CTFE unit more preferably has a reactive functional group at a main-chain end and/or in a side chain of the polymer, and the reactive functional group is preferably at least one selected from the group consisting of a carbonyl group, a hydroxyl group, a heterocyclic group, and an amino group.

In the present disclosure, the "carbonyl group" is a divalent carbon group including a carbon-oxygen double bond, and is typified by $-C(=O)-$. The reactive functional group containing the carbonyl group is not limited, and examples include those containing a carbonyl group as a part of the chemical structure, such as a carbonate group, a carboxylic acid halide group (a halogenoformyl group), a formyl group, a carboxyl group, an ester bond ($-C(=O)O-$), an acid anhydride bond ($-C(=O)O-C(=O)-$), an isocyanate group, an amide group, an imide group ($-C(=O)-NH-C(=O)-$), a urethane bond ($-NH-C(=O)O-$), a carbamoyl group ($NH_2-C(=O)-$), a carbamoyloxy group ($NH_2-C(=O)O-$), a ureido group ($NH_2-C(=O)-NH-$), and an oxamoyl group ($NH_2-C(=O)-C(=O)-$).

In the amide group, the imide group, the urethane bond, the carbamoyl group, the carbamoyloxy group, the ureido group, the oxamoyl group, and the like, a hydrogen atom bonded to the nitrogen atom thereof may be replaced with a hydrocarbon group such as an alkyl group.

In terms of the ease of introduction and in terms of suitable heat resistance and good adhesion at a relatively low temperature of the polymer having a CTFE unit, the reactive functional group is preferably an amide group, a carbamoyl group, a hydroxyl group, a carboxyl group, a carbonate group, a carboxylic acid halide group, and an acid anhydride bond, and more preferably an amide group, a carbamoyl group, a hydroxyl group, a carbonate group, a carboxylic acid halide group, and an acid anhydride bond.

In particular, those having a carbonate group and/or a carboxylic acid halide group described in International Publication No. WO 99/45044 are particularly preferable.

The polymer having a CTFE unit may be a polymer having a reactive functional group either at a main-chain end or in a side chain of the polymer, or may be a polymer having a reactive functional group both at a main-chain end and in a side chain. When the polymer has a reactive functional group at a main-chain end, the polymer may have a reactive functional group at both ends of the main chain, or may have a reactive functional group only at one end. When the reactive functional group also has an ether bond, the polymer may further have the reactive functional group in the main chain.

The polymer having a CTFE unit is preferably a polymer having a reactive functional group at a main-chain end because it does not impair mechanical properties and chemical solution resistance remarkably or because it is advantageous in terms of productivity and cost.

The number of the above reactive functional groups is suitably selected according to the difference in the kind of an adjacent layer, shape, purpose of adhering, application, required adhesion, and an adhering method with an adjacent layer.

The number of reactive functional groups at the main-chain end and/or at the side-chain end is preferably 3 to 800 per $1\times10^6$ main-chain carbon atoms. When the number is less than 3 per $1\times10^6$ main-chain carbon atoms, adhesion may be impaired. A more preferable lower limit is 15, an even more preferable lower limit is 30, and a particularly preferable lower limit is 50. In view of productivity, the upper limit of the number of reactive functional groups at the end is more preferably 200, for example.

The number of reactive functional groups at the end can be determined in the following manner: a film sheet having a thickness of 0.05 to 0.20 mm obtained by compression-molding a powder of a polymer having a CTFE unit at a molding temperature 50° C. higher than the melting point thereof under a molding pressure of 5 MPa is analyzed for an infrared absorption spectrum using an infrared spectrophotometer; the obtained infrared absorption spectrum is compared with the infrared absorption spectrum of a known film to determine the type of characteristic absorption of the reactive functional group; and the number is calculated from spectral differences according to the following formula.

Number of end groups (per $1\times10^6$ main-chain carbon atoms)=$(1\times K)/t$ l: Absorbance
K: Correction factor
t: Film thickness (mm)

Table 1 shows the correction factors for the end reactive functional groups of interest.

[Table 1]

TABLE 1

| End group | Absorption frequency (cm$^{-1}$) | Correction factor |
|---|---|---|
| —OC(=O)O—R | 1817 | 1426 |
| —COF | 1884 | 405 |
| —COOH | 1813, (1795-1792), 1775 | 455 |

TABLE 1-continued

| End group | Absorption frequency (cm$^{-1}$) | Correction factor |
|---|---|---|
| —COOCH$_3$ | 1795 | 355 |
| —CONH$_2$ | 3438 | 408 |
| —CH$_2$OH | 3648 | 2325 |

The correction factors in Table 1 are values that have been determined from the infrared absorption spectra of model compounds in order to calculate the number of end groups per 1×10$^6$ main-chain carbon atoms.

Examples of methods for introducing the reactive functional group into the main-chain and/or side-chain end include a method involving copolymerizing a monomer (β) containing the reactive functional group to introduce the reactive functional group, a method involving using a compound having or producing the reactive functional group as a polymerization initiator, a method involving using a compound having or producing the reactive functional group as a chain transfer agent, and a method involving introducing the reactive functional group into a fluoropolymer by way of a polymer reaction, and a method involving these methods in combination.

The monomer (β) containing the reactive functional group for introducing the reactive functional group by copolymerization is not limited as long as it is a monomer that is copolymerizable with a monomer yielding a polymer having a CTFE unit and that has the reactive functional group. Specific examples are as follows:

First examples of the monomer (β) include aliphatic unsaturated carboxylic acids described in International Publication No. WO 2005/100420. The unsaturated carboxylic acids preferably have at least one polymerizable carbon-carbon unsaturated bond within one molecule and at least one carbonyloxy group (—C(=O)—O—) within one molecule.

The aliphatic unsaturated carboxylic acid may be an aliphatic unsaturated monocarboxylic acid, or may be an aliphatic unsaturated polycarboxylic acid having two or more carboxyl groups. Examples of the aliphatic unsaturated monocarboxylic acid include unsaturated aliphatic monocarboxylic acids having 3 to 6 carbon atoms, such as (meth)acrylic acid and crotonic acid.

Examples of the aliphatic unsaturated polycarboxylic acid include unsaturated aliphatic polycarboxylic acids having 3 to 6 carbon atoms, such as maleic acid, fumaric acid, itaconic acid, citraconic acid, mesaconic acid, aconitic acid, maleic anhydride, itaconic anhydride, and citraconic anhydride.

Second examples of the monomer (β) include unsaturated compounds represented by the formula:

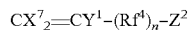

$CX^7{}_2=CY^1-(Rf^4)_n-Z^2$ wherein $Z^2$ is the above reactive functional group; $X^7$ and $Y^1$ are the same or different and are a hydrogen atom or a fluorine atom; $Rf^4$ is an alkylene group having 1 to 40 carbon atoms, a fluorine-containing oxyalkylene group having 1 to 40 carbon atoms, a fluorine-containing alkylene group having an ether bond and having 2 to 40 carbon atoms, or a fluorine-containing oxyalkylene group having an ether bond and having 2 to 40 carbon atoms; and n is 0 or 1.

The content of the unit introduced by copolymerization from the monomer (β) containing the reactive functional group is preferably 0.05 mol % or more, and more preferably 0.1 mol % or more. When the content is excessive, gelation and a vulcanization reaction likely occur during thermal melting, and thus the upper limit of the content of the monomer (β) unit is preferably 5 mol %, and more preferably 3 mol %.

The polymer having a CTFE unit may have a heterocyclic group or an amino group at the main-chain end or the side-chain end of the polymer.

The heterocyclic group has a hetero atom (such as a nitrogen atom, a sulfur atom, or an oxygen atom) within the ring of its hetero ring moiety, may be a saturated ring or an unsaturated ring, and may be a single ring or a condensed ring. The heterocyclic group is preferably an oxazolyl group.

The amino group is a monovalent functional group obtained by removing hydrogen from ammonia or a primary or secondary amine. Specifically, the amino group is a group represented by, for example, the formula:

—NR$^1$R$^2$ wherein R$^1$ and R$^2$ may be the same or different, and are a hydrogen atom or a monovalent organic group having 1 to 20 carbon atoms. Specific examples of the amino group include —NH$_2$, —NH(CH$_3$), —N(CH$_3$)$_2$, —NH(CH$_2$CH$_3$), —N(C$_2$H$_5$)$_2$, and —NH(C$_6$H$_5$).

The polymer having a CTFE unit can be obtained by a conventionally known polymerization method such as suspension polymerization, solution polymerization, emulsion polymerization, and bulk polymerization. In the polymerization, conditions such as temperature and pressure as well as a polymerization initiator and other additives can be suitably set according to the composition and the amount of the polymer having a CTFE unit.

The melting point of the polymer having a CTFE unit is preferably, but not limited to, 160 to 270° C.

The molecular weight of the polymer having a CTFE unit is preferably in such a range that the molded body to be obtained can exhibit good mechanical properties and low fuel permeability. For example, when the melt flow rate (MFR) is used as a measure of a molecular weight, the MFR at an arbitrary temperature (for example, 297° C.) within the range of about 230 to 350° C., which is the molding temperature range of fluoropolymers in general, is preferably 0.5 to 100 g/10 min. The MFR (297° C., 5 kg) of the polymer having a CTFE unit is more preferably 1 to 50 g/10 min, and even more preferably 2 to 40 g/10 min.

As the polymerization initiator, for example, usable are oil-soluble radical polymerization initiators typified by peroxycarbonates such as diisopropyl peroxydicarbonate (IPP) and di-n-propyl peroxydicarbonate (NPP), and water-soluble radical polymerization initiators such as ammonium salts, potassium salts, and sodium salts of persulfuric acid, perboric acid, perchloric acid, perphosphoric acid, and percarbonic acid. Among these, di-n-propyl peroxydicarbonate (NPP) is preferable.

In terms of good dispersibility and uniformity in the reaction system, the chain transfer agent is preferably at least one selected from the group consisting of water-soluble alcohols having 1 to 4 carbon atoms, hydrocarbons having 1 to 4 carbon atoms, fluorohydrocarbons having 1 to 4 carbon atoms, and persulfates. The chain transfer agent is more preferably at least one selected from the group consisting of methane, ethane, n-butane, isobutane, methanol, n-propyl alcohol, HFC-134a, HFC-32, disuccinic acid peroxide, ammonium persulfate, and potassium persulfate, and even more preferably at least one selected from the group consisting of n-propyl alcohol, methanol, and isobutane.

The layer (B) may contain various additives, e.g., electroconductive fillers, stabilizers such as heat stabilizers, reinforcing agents, fillers, UV absorbers, and pigments as long as the object of the present disclosure is not impaired. Such additives can increase the properties of the layer (B), such as thermal stability, surface hardness, abrasion resistance, electrostatic properties, and weather resistance.

3. Layer (C)

The layer (C) contains a non-fluorinated polymer. The layer (C) included in the laminate of the present disclosure can impart the desired properties such as flexibility, high strength, and high toughness to the laminate.

The layer (C) can contain a non-fluorinated elastomer as a non-fluorinated polymer. When the layer (C) contains a non-fluorinated elastomer, the laminate of the present disclosure has suitable strength as well as excellent flexibility.

The layer (C) can contain a non-fluorinated resin as a non-fluorinated polymer. When the layer (C) contains a non-fluorinated resin, the laminate of the present disclosure has suitable flexibility as well as excellent strength, high toughness, and low oxygen permeability.

3-1. Non-Fluorinated Elastomer

Examples of the non-fluorinated elastomer include diene-based rubber such as acrylonitrile-butadiene rubber (NBR) or a hydride thereof (HNBR), styrene-butadiene rubber (SBR), chloroprene rubber (CR), butadiene rubber (BR), natural rubber (NR) and isoprene rubber (IR), ethylene-propylene-termonomer copolymer rubber, silicone rubber, butyl rubber, epichlorohydrin rubber, and acryl-based rubber.

Among these, the non-fluorinated elastomer is preferably diene-based rubber, epichlorohydrin rubber (ECO), or acryl-based rubber, and more preferably acrylonitrile-butadiene rubber (NBR) or epichlorohydrin rubber (ECO), in terms of good heat resistance, oil resistance, weather resistance, and extrusion moldability.

The acryl-based rubber is, for example, a polymer including a polymerization unit based on an acrylic acid ester, and it may be a copolymer including polymerization units based on two or more acrylic acid esters, or may be a copolymer including a polymerization unit or polymerization units based on one or more acrylic acid esters and a polymerization unit based on a monomer copolymerizable with an acrylic acid ester. As the acryl-based rubber, unvulcanized acrylic rubber described in Japanese Patent Laid-Open No. 2014-111379 is usable, for example.

The layer (C) containing a non-fluorinated elastomer is preferably formed from a rubber composition for vulcanization containing an unvulcanized non-fluorinated elastomer (c1).

Examples of the rubber composition for vulcanization include rubber compositions for vulcanization disclosed in Japanese Patent Laid-Open No. 2012-126015, International Publication No. WO 2011/001756, Japanese Patent Laid-Open No. 2010-89479, Japanese Patent Laid-Open No. 2012-61644, Japanese Patent Laid-Open No. 2012-81682, International Publication No. WO 2012/063893, Japanese Patent Laid-Open No. 2013-176961, Japanese Patent Laid-Open No. 2013-099935, and International Publication No. WO 2013/089200.

Preferably, the rubber composition for vulcanization contains the unvulcanized non-fluorinated elastomer (c1), a compound (c2), magnesium oxide (c3), and silica (c4) as essential components, and further contains at least any of a vulcanizing agent (c5) and a metal salt (c6) as an optional component.

In particular, when the rubber composition for vulcanization contains the vulcanizing agent (c5) and the metal salt (c6) in addition to the unvulcanized non-fluorinated elastomer (c1) and the compound (c2), the layer (C) is even more firmly adhered to the adjacent layer. An epoxy resin (c7) is also preferably contained.

The rubber composition for vulcanization may contain a resin in order to impart properties different from those of the unvulcanized non-fluorinated elastomer (c1) to the layer (C). Examples of the resin include PVC, chlorinated polystyrene, chlorosulfonated polyethylene, and an ethylene-vinyl acetate copolymer. For example, when the rubber composition for vulcanization contains NBR and PVC, ozone resistance can be increased. In this case, the content of PVC is preferably 10 to 70 parts by mass based on 100 parts by mass of NBR.

The compound (c2) is preferably at least one compound selected from the group consisting of a 1,8-diazabicyclo (5.4.0)undecene-7 salt (DBU salt), a 1,5-diazabicyclo (4.3.0)-nonene-5 salt (DBN salt), a 1,8-diazabicyclo(5.4.0) undecene-7 (DBU), and 1,5-diazabicyclo(4.3.0)-nonene-5 (DBN). The compound (c2) can improve the vulcanization properties of the rubber composition for vulcanization.

Examples of the DBU salt and the DBN salt include carbonic acid salts, long-chain aliphatic carboxylic acid salts, aromatic carboxylic acid salts, orthophthalic acid salts, p-toluenesulfonic acid salts, phenol salts, phenol resin salts, naphthoic acid salts, octylic acid salts, oleic acid salts, formic acid salts, and phenol novolac resin salts of DBU or DBN, and preferable is at least one compound selected from the group consisting of 8-benzyl-1,8-diazabicyclo(5.4.0)-7-undecenium chloride (DBU-B), naphthoic acid salts, orthophthalic acid salts, phenol salts, and formic acid salts.

More specifically, the compound (c2) is preferably at least one compound selected from the group consisting of 1,8-diazabicyclo(5.4.0)undecene-7,8-benzyl-1,8-diazabicyclo (5.4.0)-7-undecenium chloride, a naphthoic acid salt of 1,8-diazabicyclo(5.4.0)undecene-7, a phenol salt of 1,8-diazabicyclo(5.4.0)undecene-7, an orthophthalic acid salt of 1,8-diazabicyclo(5.4.0)undecene-7, and a formic acid salt of 1,8-diazabicyclo(5.4.0)undecene-7.

The compound (c2) is more preferably at least one compound selected from the group consisting of 1,8-diazabicyclo(5.4.0)undecene-7,8-benzyl-1,8-diazabicyclo (5.4.0)-7-undecenium chloride, a phenol salt of 1,8-diazabicyclo(5.4.0)undecene-7, an orthophthalic acid salt of 1,8-diazabicyclo(5.4.0)undecene-7, and a formic acid salt of 1,8-diazabicyclo(5.4.0)undecene-7. The compound (c2) is even more preferably at least one compound selected from the group consisting of 8-benzyl-1,8-diazabicyclo(5.4.0)-7-undecenium chloride, a formic acid salt of 1,8-diazabicyclo (5.4.0)undecene-7, and a phenol salt of 1,8-diazabicyclo (5.4.0)undecene-7.

Also, in one preferable mode, the compound (c2) is at least one compound selected from the group consisting of DBU-B, a phenol salt of DBU, an orthophthalic acid salt of DBU, and a formic acid salt of DBU.

The amount of the compound (c2) is preferably more than 0.3 parts by mass and 5 parts by mass or less based on 100 parts by mass of the unvulcanized non-fluorinated elastomer (c1). The amount of the compound (c2) is more preferably 0.5 parts by mass or more based on 100 parts by mass of the unvulcanized non-fluorinated elastomer (c1). When the amount of the compound (c2) is excessively small, adhesion may be insufficient. The amount of the compound (c2) is more preferably 4 parts by mass or less, even more preferably 3.5 parts by mass or less, and particularly preferably 3 parts by mass or less based on 100 parts by mass of the unvulcanized non-fluorinated elastomer (c1).

The rubber composition for vulcanization preferably contains magnesium oxide (c3). In terms of adhesion and rubber properties, the content of magnesium oxide (c3) is preferably 3 to 20 parts by mass and particularly preferably 5 to 15 parts by mass based on 100 parts by mass of the unvulcanized non-fluorinated elastomer (c1). In the case where magnesium oxide (c3) is essential, the laminate of the present disclosure can have excellent adhesion.

The rubber composition for vulcanization preferably contains silica (c4). Basic silica and acidic silica can be used as silica (c4), and basic silica is more preferably used in view of adhesion. An example of basic silica is Carplex 1120 (manufactured by DSL Japan Co., Ltd.). In view of adhesion and rubber properties, the amount of silica (c4) is preferably 10 to 100 parts by mass and particularly preferably 15 to 70 parts by mass based on 100 parts by mass of the unvulcanized non-fluorinated elastomer (c1). In the case where silica (c4) is essential, the laminate of the present disclosure can have excellent adhesion.

As the vulcanizing agent (c5), a conventionally known vulcanizing agent can be used according to the vulcanization system of the rubber composition for vulcanization. Vulcanization of the unvulcanized non-fluorinated elastomer (c1) increases the mechanical strength such as tensile strength of the vulcanized rubber layer to be obtained, and can bring about good elasticity as well.

As a vulcanization system that can be used in the present disclosure, any of a sulfur vulcanization system, a polyamine vulcanization system, a polyol vulcanization system, a peroxide vulcanization system, an imidazole vulcanization system, a triazine vulcanization system, an oxazole vulcanization system, and a thiazole vulcanization system can be employed, and when a vulcanizable group (a cure site) is contained in the unvulcanized non-fluorinated elastomer, the vulcanization system is suitably selected according to the kind of cure site, or according to the properties to be imparted to the vulcanized laminate or the application.

As the vulcanizing agent (c5), any of a sulfur vulcanization system vulcanizing agent, a polyamine vulcanization system vulcanizing agent, a polyol vulcanization system vulcanizing agent, a peroxide vulcanization system vulcanizing agent, an imidazole vulcanization system vulcanizing agent, a triazine vulcanization system vulcanizing agent, an oxazole vulcanization system vulcanizing agent, and a thiazole vulcanization system vulcanizing agent can be employed according to the vulcanization system, and these may be used singly or in combination.

For example, when the unvulcanized non-fluorinated elastomer (c1) is a diene-based non-fluorinated elastomer (such as NBR, SBR, or BR), a sulfur vulcanization system and a peroxide vulcanization system are usually employed, and thus the vulcanizing agent is also preferably at least one selected from the group consisting of a sulfur vulcanization system vulcanizing agent and a peroxide vulcanization system vulcanizing agent.

Examples of the sulfur vulcanization system vulcanizing agent include powdered sulfur, precipitated sulfur, colloidal sulfur, surface-treated sulfur, insoluble sulfur, sulfur chloride, sulfur dichloride, a disulfide compound, and a polysulfide compound.

The content of the sulfur vulcanization system vulcanizing agent is preferably 0.1 to 10 parts by mass based on 100 parts by mass of the unvulcanized non-fluorinated elastomer (c1). When the content is excessively small, adhesion tends to be insufficient, and when excessively large, hardness tends to be excessive.

A preferable peroxide vulcanization system vulcanizing agent is an organic peroxide that readily produces a peroxy radical in the presence of heat or a redox system.

Examples of the organic peroxide include 1,1-bis(t-butylperoxy)-3,5,5-trimethylcyclohexane, 2,5-dimethyl-hexane-2,5-dihydroxy peroxide, di-t-butyl peroxide, t-butyl cumyl peroxide, dicumyl peroxide, α,α'-bis(t-butylperoxy)-p-diisopropylbenzene, 2,5-dimethyl-2,5-di(t-butylperoxy) hexane, 2,5-dimethyl-2,5-di(t-butylperoxy)hexyne-3, benzoyl peroxide, t-butyl peroxybenzene, 2,5-dimethyl-2,5-di (benzoylperoxy)hexane, t-butyl peroxymaleic acid, and t-butyl peroxyisopropyl carbonate. In particular, dialkyl compounds are preferable. Generally, the kind and the content are selected according to the amount of active —O=O—, the decomposition temperature, and the like. The content is usually 0.1 to 15 parts by mass and preferably 0.3 to 5 parts by mass based on 100 parts by mass of the unvulcanized non-fluorinated elastomer.

The vulcanizing agent (c5) is preferably at least one selected from the group consisting of a sulfur vulcanization system vulcanizing agent and a peroxide vulcanization system vulcanizing agent and more preferably a sulfur vulcanization system vulcanizing agent, and the amount of the vulcanizing agent added is preferably 0.5 to 5 parts by mass and particularly preferably 1.0 to 3 parts by mass based on 100 parts by mass of the unvulcanized non-fluorinated elastomer (c1).

The metal salt (c6) is preferably at least one selected from the group consisting of a carbamic acid metal salt and a thiazole-type metal salt.

Examples of the carbamic acid metal salt include a zinc salt of dimethyldithiocarbamate (ZnMDC), a zinc salt of diethyldithiocarbamate (ZnEDC), a zinc salt of dibutyldithiocarbamate (ZnBDC), an iron salt of dimethyldithiocarbamate (FeMDC), a zinc salt of ethylphenyldithiocarbamate (ZnEPDC), a zinc salt of N-pentamethylenedithiocarbamate, a zinc salt of dibenzyldithiocarbamate, a sodium salt of dimethyldithiocarbamate (NaMDC), a sodium salt of diethyldithiocarbamate (NaEDC), a sodium salt of dibutyldithiocarbamate (NaBDC), a copper salt of dimethyldithiocarbamate (CuMDC), and a tellurium salt of diethyldithiocarbamate (TeEDC). These are used singly or in combination of two or more. Among these, ZnMDC, ZnEDC, or ZnBDC is suitably used in terms of adhesion and rubber properties.

As the thiazole-type metal salt, a zinc salt of mercaptobenzothiazole (ZnMBT) is suitably used.

The content of the metal salt (c6) is preferably 0.01 to 5 parts by mass, more preferably 0.01 to 3 parts by mass, and particularly preferably 0.05 to 2 parts by mass based on 100 parts by mass of the unvulcanized non-fluorinated elastomer (c1). When the content of the metal salt (c6) is excessively small, the vulcanized rubber properties tend to be impaired, and when excessively large, the unvulcanized properties tend to be impaired.

Preferably, the rubber composition for vulcanization does not contain an amine compound because the amine compound deteriorates vulcanization properties and impairs rubber properties.

In the present disclosure, ordinary additives that are contained in common rubber compositions for vulcanization can be contained according to the object or as necessary, including fillers, processing aids, plasticizers, softeners, anti-aging agents, colorants, stabilizers, adhesion aids, mold releasing agents, electroconductivity imparting agents, thermal conductivity imparting agents, anti-tackifiers for surfaces, tackifiers, flexibility imparting agents, heat resistance improvers, flame retarders, UV absorbers, oil resistance improvers, foaming agents, anti-scorching agents, lubricants, epoxy resins, and like various additives. One or more common vulcanizing agents and vulcanization accelerators that are different from those described above may be added.

Examples of fillers include metal oxides such as calcium oxide, titanium oxide, and aluminum oxide; metal hydroxides such as magnesium hydroxide, aluminum hydroxide, and calcium hydroxide; carbonic acid salts such as magnesium carbonate, aluminum carbonate, calcium carbonate, and barium carbonate; silicic acid salts such as magnesium silicate, calcium silicate, sodium silicate, and aluminum silicate; sulfuric acid salts such as aluminum sulfate, calcium sulfate, and barium sulfate; synthetic hydrotalcite, and metal sulfides such as molybdenum disulfide, iron sulfide, and copper sulfide; diatomaceous earth, asbestos, lithopone (zinc sulfide/barium sulfide), graphite, carbon black, carbon fluoride, calcium fluoride, coke, fine quartz powder, zinc flower, talc, mica powder, wollastonite, carbon fiber, aramid fiber, various whiskers, glass fiber, organic reinforcing agents, and organic fillers.

Examples of processing aids include higher fatty acids such as stearic acid, oleic acid, palmitic acid, and lauric acid; higher fatty acid salts such as sodium stearate and zinc stearate; higher fatty acid amides such as stearic acid amide and oleic acid amide; higher fatty acid esters such as ethyl oleate, and higher aliphatic amines such as stearylamine and oleylamine; petroleum-type waxes such as carnauba wax and ceresin wax; polyglycols such as ethylene glycol, glycerin, and diethylene glycol; aliphatic hydrocarbons such as petrolatum and paraffin; silicone-type oils, silicone-type polymers, low molecular weight polyethylenes, phthalic acid esters, phosphoric acid esters, rosin, (halogenated) dialkylamines, (halogenated) dialkyl sulfones, and surfactants.

Examples of plasticizers include phthalic acid derivatives and sebacic acid derivatives. Examples of softeners include lubricating oil, process oil, coal tar, castor oil, and calcium stearate. Examples of anti-aging agents include phenylenediamines, phosphates, quinolines, cresols, phenols, and dithiocarbamate metal salts.

Examples of the epoxy resin (c7) include bisphenol A epoxy resins, bisphenol F epoxy resins, and polyfunctional epoxy resins. Among these, bisphenol A epoxy resins are preferable in terms of good chemical solution resistance and adhesion, and, moreover, epoxy resins represented by formula (1):

more, and particularly preferably 3 parts by mass or more based on 100 parts by mass of the unvulcanized non-fluorinated elastomer (c1). In terms of preventing the rubber layer from becoming excessively hard, the content is preferably 25 parts by mass or less, more preferably 15 parts by mass or less, and particularly preferably 10 parts by mass or less based on 100 parts by mass of the unvulcanized non-fluorinated elastomer (c1).

The rubber composition for vulcanization is prepared by kneading the unvulcanized non-fluorinated elastomer (c1), the compound (c2), the magnesium oxide (c3) and the silica (c4), and, as necessary, the vulcanizing agent (c5), the metal salt (c6), and other additives.

Kneading can be performed, for example, at a temperature of 100° C. or lower using an open roll, a Banbury mixer, a pressure kneader, or the like.

As for the rubber composition for vulcanization, the optimum vulcanization time (T90) is preferably 18 minutes or less. The optimum vulcanization time is more preferably 15 minutes or less, and even more preferably 13 minutes or less. The lower limit of T90 is not limited, and is, for example, 1 minute or more. With the rubber composition for vulcanization having the above-described configuration, the vulcanization time can be short, and productivity can be increased. T90 is a value obtained by measuring the maximum torque value (MH) and the minimum torque value (ML) at 160° C., and is a value determined by {(MH)−(ML)}×0.9+ML. MH and ML are values measured in accordance with JIS K 6300-2.

When the unvulcanized non-fluorinated elastomer (c1) is epichlorohydrin rubber, preferably the rubber composition for vulcanization contains epichlorohydrin rubber (c1-1), a compound (c2-1), magnesium oxide (c3-1), silica (c4-1), and an epoxy resin (c7-1) as essential components, and, as optional components, further contains at least any of zinc oxide (c8) and a vulcanizing agent (c5-1) or contains epichlorohydrin rubber (c1-1), a compound (c2-1), an epoxy resin (c7-1), and a water-carrying substance (c9). In particular, when the rubber composition for vulcanization contains the vulcanizing agent (c5-1) in addition to the epichlorohydrin rubber (c1-1) and the compound (c2-1), the layer (C) can be adhered to the adjacent layer with large adhesive strength.

The epichlorohydrin rubber (c1-1) is not limited as long as it is an unvulcanized non-fluorinated elastomer having a polymerization unit based on epichlorohydrin, and the epichlorohydrin rubber (c1-1) may be a homopolymer

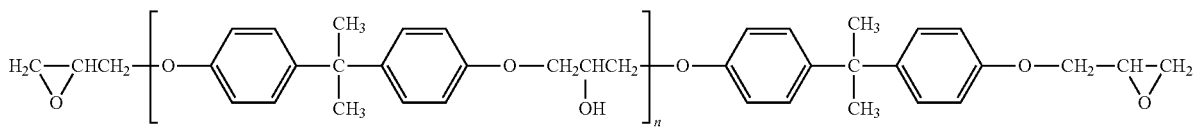

are particularly preferable. Here, in formula (1), n is an average value and is preferably 0.1 to 3, more preferably 0.1 to 0.5, and even more preferably 0.1 to 0.3. When n is less than 0.1, adhesion to the layer (B) tends to be impaired. On the other hand, when n exceeds 3, the viscosity of the epoxy resin itself is increased, and uniformly dispersing the epoxy resin in the rubber composition for vulcanization thus tends to be difficult.

In terms of further increasing adhesion to the layer (B), the content of the epoxy resin if contained is preferably 1 part by mass or more, more preferably 2 parts by mass or including substantially solely a polymerization unit based on epichlorohydrin, or may be a binary or multinary polymer including a polymerization unit based on epichlorohydrin and a polymerization unit based on a further monomer other than epichlorohydrin.

The further monomer other than epichlorohydrin is preferably, for example, at least one monomer selected from the group consisting of ethylene oxide, propylene oxide, and allyl glycidyl ether. The epichlorohydrin rubber is preferably a polymer having a polymerization unit based on epichlorohydrin and a polymerization unit based on ethylene oxide, and is more preferably a polymer having a polymerization unit based on epichlorohydrin, a polymerization unit based on ethylene oxide, and a polymerization unit based on allyl glycidyl ether.

The epichlorohydrin rubber (c1-1) is preferably, for example, at least one polymer selected from the group consisting of an epichlorohydrin homopolymer, an epichlorohydrin-ethylene oxide copolymer, an epichlorohydrin-allyl glycidyl ether copolymer, an epichlorohydrin-ethylene oxide-allyl glycidyl ether copolymer, an epichlorohydrin-propylene oxide copolymer, an epichlorohydrin-propylene oxide-allyl glycidyl ether copolymer, and an epichlorohydrin-ethylene oxide-propylene oxide-allyl glycidyl ether quaternary copolymer. More preferable is at least one polymer selected from the group consisting of an epichlorohydrin-ethylene oxide copolymer and an epichlorohydrin-ethylene oxide-allyl glycidyl ether copolymer. These can be used singly or in the form of a mixture of two or more.

The compound (c2-1) is preferably at least one compound selected from the group consisting of a 1,8-diazabicyclo(5.4.0)undecene-7 salt (DBU salt), a 1,5-diazabicyclo(4.3.0)-nonene-5 salt (DBN salt), a 1,8-diazabicyclo(5.4.0)undecene-7 (DBU), and 1,5-diazabicyclo(4.3.0)-nonene-5 (DBN).

Also, the compound (c2-1) is preferably at least one compound selected from the group consisting of a p-toluenesulfonic acid salt of 1,8-diazabicyclo(5.4.0)undecene-7, a phenol salt of 1,8-diazabicyclo(5.4.0)undecene-7, a phenol resin salt of 1,8-diazabicyclo(5.4.0)undecene-7, an orthophthalic acid salt of 1,8-diazabicyclo(5.4.0)undecene-7, a formic acid salt of 1,8-diazabicyclo(5.4.0)undecene-7, an octylic acid salt of 1,8-diazabicyclo(5.4.0)undecene-7, a p-toluenesulfonic acid salt of 1,5-diazabicyclo(4.3.0)-nonene-5, a phenol salt of 1,5-diazabicyclo(4.3.0)-nonene-5, a phenol resin salt of 1,5-diazabicyclo(4.3.0)-nonene-5, an orthophthalic acid salt of 1,5-diazabicyclo(4.3.0)-nonene-5, a formic acid salt of 1,5-diazabicyclo(4.3.0)-nonene-5, and an octylic acid salt of 1,5-diazabicyclo(4.3.0)-nonene-5. The compound (c2-1) can improve the vulcanization properties of the rubber composition for vulcanization, and increase adhesion.

The compound (c2-1) is preferably at least one compound selected from the group consisting of a p-toluenesulfonic acid salt of 1,8-diazabicyclo(5.4.0)undecene-7, a phenol salt of 1,8-diazabicyclo(5.4.0)undecene-7, a phenol resin salt of 1,8-diazabicyclo(5.4.0)undecene-7, an orthophthalic acid salt of 1,8-diazabicyclo(5.4.0)undecene-7, a formic acid salt of 1,8-diazabicyclo(5.4.0)undecene-7, and an octylic acid salt of 1,8-diazabicyclo(5.4.0)undecene-7.

In view of increasing adhesion, the compound (c2-1) is more preferably an octylic acid salt of 1,8-diazabicyclo(5.4.0)undecene-7 or a phenol resin salt of 1,8-diazabicyclo(5.4.0)undecene-7.

In one preferable mode, the rubber composition for vulcanization further contains a phosphonium salt. Combination use of a phosphonium salt with the compound (c2-1) can further increase adhesion.

Specifically, the compound (c2-1), for example, is at least one compound selected from the group consisting of a phenol salt of 1,8-diazabicyclo(5.4.0)undecene-7, an orthophthalic acid salt of 1,8-diazabicyclo(5.4.0)undecene-7, a formic acid salt of 1,8-diazabicyclo(5.4.0)undecene-7, and an octylic acid salt of 1,8-diazabicyclo(5.4.0)undecene-7, and preferably, the rubber composition for vulcanization further contains a phosphonium salt.

Preferably, an octylic acid salt of 1,8-diazabicyclo(5.4.0)undecene-7 or a phenol resin salt of 1,8-diazabicyclo(5.4.0)undecene-7 is essential to the compound (c2-1).

In view of good adhesion, the amount of the compound (c2-1) is preferably 0.5 parts by mass or more and 5 parts by mass or less based on 100 parts by mass of the epichlorohydrin rubber (c1-1). More preferably, the amount of the compound (c2-1) is 1 part by mass or more and 4 parts by mass or less. Also, in terms of good adhesion and good vulcanization properties, the amount of the compound (c2-1) is preferably 1 part by mass or more and 3 parts by mass or less based on 100 parts by mass of the epichlorohydrin rubber (c1-1).

The rubber composition for vulcanization preferably contains magnesium oxide (c3-1). In terms of adhesion and rubber properties, the content of magnesium oxide (c3-1) is preferably 3 to 20 parts by mass and particularly preferably 5 to 15 parts by mass based on 100 parts by mass of the epichlorohydrin rubber (c1-1). In the case where magnesium oxide (c3-1) is essential, the laminate of the present disclosure has excellent adhesion.

The rubber composition for vulcanization preferably contains silica (c4-1). Basic silica and acidic silica are usable as the silica (c4-1), and basic silica is preferably used in view of adhesion. An example of basic silica is Carplex 1120 (manufactured by DSL Japan Co., Ltd.). In view of adhesion and rubber properties, the amount of the silica (c4-1) is preferably 5 to 40 parts by mass and particularly preferably 10 to 25 parts by mass based on 100 parts by mass of the epichlorohydrin rubber (c1-1). In the case where the silica (c4-1) is essential, the laminate of the present disclosure can have excellent adhesion.

The rubber composition for vulcanization preferably contains an epoxy resin (c7-1). The epoxy resin (c7-1) is the same as the epoxy resin (c7) described above.

In terms of further increasing adhesion between the layer (B) and the layer (C), the amount of the epoxy resin (c7-1) is preferably 0.1 to 5 parts by mass and more preferably 0.3 to 3 parts by mass based on 100 parts by mass of the epichlorohydrin rubber (c1-1). While the amount of the epoxy resin (c7-1) added depends on the amounts of the compound (c2-1), the magnesium oxide (c3-1), the silica (c4-1), and the like added to the rubber composition for vulcanization, the amount of the epoxy resin (c7-1) is preferably more than 0.5 parts by mass based on 100 parts by mass of the epichlorohydrin rubber (c1-1) in view of increasing adhesion. Also, in one preferable mode, the amount of the epoxy resin (c7-1) exceeds 1 part by mass.

In one preferable mode, the rubber composition for vulcanization in which the total of the compound (c2-1) and the epoxy resin (c7-1) exceeds 2 parts by mass based on 100 parts by mass of the epichlorohydrin rubber (c1-1).

Preferably, the rubber composition for vulcanization further contains zinc oxide (c8). In terms of adhesion and rubber properties, the content of zinc oxide (c8) is preferably 3 to 20 parts by mass and particularly preferably 5 to 15 parts by mass based on 100 parts by mass of the epichlorohydrin rubber (c1-1). Zinc oxide (c8) imparts better adhesion to the laminate of the present disclosure.

The rubber composition for vulcanization preferably contains a vulcanizing agent (c5-1). As the vulcanizing agent, a conventionally known vulcanizing agent can be used according to the vulcanization system of the rubber composition for vulcanization. Vulcanization of the epichlorohydrin rubber (c1-1) increases the mechanical strength such as tensile strength of the vulcanized rubber layer to be obtained, and can bring about good elasticity as well.

Examples of the vulcanizing agent (c5-1) include known vulcanizing agents that utilize the reactivity of a chlorine atom, such as polyamine-type vulcanizing agents, thiourea-type vulcanizing agents, thiadiazole-type vulcanizing agents, mercaptotriazine-type vulcanizing agents, pyrazine-type vulcanizing agents, quinoxaline-type vulcanizing agents, and bisphenol-type vulcanizing agents.

Among the examples of known vulcanizing agents that utilize the reactivity of a chlorine atom, examples of the polyamine-type vulcanizing agents include ethylenediamine, hexamethylenediamine, diethylenetriamine, triethylenetetramine, hexamethylenetetramine, p-phenylenediamine, cumene diamine, N,N'-dicinnamylidene-1,6-hexanediamine, ethylenediamine carbamate, and hexamethylenediamine carbamate.

Examples of the thiourea-type vulcanizing agents include ethylene thiourea, 1,3-diethyl thiourea, 1,3-dibutyl thiourea, and trimethyl thiourea.

Examples of the thiadiazole-type vulcanizing agents include 2,5-dimercapto-1,3,4-thiadiazole and 2-mercapto-1,3,4-thiadiazole-5-thiobenzoate.

Examples of the mercaptotriazine-type vulcanizing agents include 2,4,6-trimercapto-1,3,5-triazine, 1-methoxy-3,5-dimercaptotriazine, 1-hexylamino-3,5-dimercaptotriazine, 1-diethylamino-3,5-dimercaptotriazine, 1-cyclohexaneamino-3,5-dimercaptotriazine, 1-dibutylamino-3,5-dimercaptotriazine, 2-anilino-4,6-dimercaptotriazine, and 1-phenylamino-3,5-dimercaptotriazine.

Examples of the pyrazine-type vulcanizing agents include 2,3-dimercaptopyrazine derivatives, and examples of the 2,3-dimercaptopyrazine derivatives include pyrazine-2,3-dithiocarbonate, 5-methyl-2,3-dimercaptopyrazine, 5-ethylpyrazine-2,3-dithiocarbonate, 5,6-dimethyl-2,3-dimercaptopyrazine, and 5,6-dimethylpyrazine-2,3-dithiocarbonate.

Examples of the quinoxaline-type vulcanizing agents include 2,3-dimercaptoquinoxaline derivatives, and examples of the 2,3-dimercaptoquinoxaline derivatives include quinoxaline-2,3-dithiocarbonate, 6-methylquinoxaline-2,3-dithiocarbonate, 6-ethyl-2,3-dimercaptoquinoxaline, 6-isopropylquinoxaline-2,3-dithiocarbonate, and 5,8-dimethylquinoxaline-2,3-dithiocarbonate.

Examples of the bisphenol-type vulcanizing agents include 4,4'-dihydroxydiphenyl sulfoxide, 4,4'-dihydroxydiphenyl sulfone (bisphenol S), 1,1-cyclohexylidene-bis(4-hydroxybenzene), 2-chloro-1,4-cyclohexylene-bis(4-hydroxybenzene), 2,2-isopropylidene-bis(4-hydroxybenzene) (bisphenol A), hexafluoroisopropylidene-bis(4-hydroxybenzene) (bisphenol AF), and 2-fluoro-1,4-phenylene-bis(4-hydroxybenzene).

In the present disclosure, a known vulcanization accelerator or retarder can be directly used together with the vulcanizing agent in the rubber composition for vulcanization. Examples of the vulcanization accelerator used in combination with a known vulcanizing agent that utilizes the reactivity of a chlorine atom include primary, secondary and tertiary amines, organic acid salts of the amines or adducts thereof, guanidine-type accelerators, thiuram-type accelerators, dithiocarbamic acid-type accelerators.

Examples of the retarder include N-cyclohexanethiophthalimide and zinc salts of dithiocarbamic acids.

As for the examples of the vulcanization accelerator, the primary, secondary, or tertiary amines are preferably primary, secondary, or tertiary amines of aliphatic or cyclic fatty acids having 5 to 20 carbon atoms, and representative examples of such amines are n-hexylamine, octylamine, dibutylamine, tributylamine, and hexamethylenediamine.

Examples of the organic acid that forms a salt with an amine include carboxylic acid, carbamic acid, 2-mercaptobenzothiazole, and dithiophosphoric acid. Examples of the substance that forms an adduct with the above amine include alcohols and oximes. Specific examples of organic acid salts or adducts of amines include a n-butylamine/acetic acid salt, a hexamethylenediamine/carbamic acid salt, and a dicyclohexylamine salt of 2-mercaptobenzothiazole.

Examples of the guanidine-type accelerators include diphenylguanidine and ditolylguanidine.

Specific examples of the thiuram-type vulcanization accelerators include tetramethylthiuram disulfide, tetramethylthiuram monosulfide, tetraethylthiuram disulfide, tetrabutylthiuram disulfide, and dipentamethylenethiuram tetrasulfide.

Examples of the dithiocarbamic acid-type accelerators include a pentamethylenedithiocarbamic acid piperidine salt.

The content of the vulcanization accelerator or retarder used in combination with a known vulcanizing agent that utilizes the reactivity of a chlorine atom is preferably 0 to 10 parts by mass and more preferably 0.1 to 5 parts by mass based on 100 parts by mass of the rubber component.

When the epichlorohydrin rubber (c1-1) is a polymer having a double bond such as an epichlorohydrin-allyl glycidyl ether copolymer or an epichlorohydrin-ethylene oxide-allyl glycidyl ether ternary copolymer, known vulcanizing agents, vulcanization accelerators, vulcanization retarders, vulcanization acceleration aids, crosslinking aids, and the like that are commonly used in the vulcanization of nitrile-based rubber can be used. Examples of the vulcanizing agents include sulfur-type vulcanizing agents such as sulfur, morpholine disulfide, tetramethylthiuram disulfide, tetraethylthiuram disulfide, tetrabutylthiuram disulfide, N,N'-dimethyl-N,N'-diphenylthiuram disulfide, dipentamethylenethiuram tetrasulfide, and dipentamethylenethiuram hexasulfide, peroxide-type vulcanizing agents such as tert-butyl hydroperoxide, p-menthane hydroperoxide, dicumyl peroxide, tert-butyl peroxide, 1,3-bis(tert-butylperoxyisopropyl)benzene, 2,5-dimethyl-2,5-di(tert-butylperoxy) hexane, benzoyl peroxide, and tert-butyl peroxybenzoate, resin-type vulcanizing agents such as alkylphenol formaldehyde resins, and quinone dioxime-type vulcanizing agents such as p-quinone dioxime and p-p'-dibenzoylquinone dioxime. These vulcanizing agents can be used singly or in the form of a mixture of two or more. Examples of the vulcanization accelerators, the vulcanization retarders, the vulcanization acceleration aids, and the crosslinking aids include various vulcanization accelerators such as aldehyde ammonia-type accelerators, aldehyde amine-type accelerators, thiourea-type accelerators, guanidine-type accelerators, thiazole-type accelerators, sulfenamide-type accelerators, thiuram-type accelerators, dithiocarbamic acid salt-type accelerators, and xanthogenic acid salt-type accelerators, vulcanization retarders such as N-nitrosodiphenylamine, phthalic anhydride, and N-cyclohexyl thiophthalimide, vulcanization acceleration aids such as zinc flower, stearic acid, and zinc stearate, and various crosslinking aids such as quinone dioxime-type crosslinking aids, methacrylate-type crosslinking aids, allyl-type crosslinking aids, and maleimide-type crosslinking aids.

In view of the heat resistance of the epichlorohydrin rubber (c1-1) and adhesion between the layer (B) and the layer (C), the vulcanizing agent (c5-1) is preferably at least one vulcanizing agent selected from the group consisting of thiourea-type vulcanizing agents, quinoxaline-type vulcanizing agents, sulfur-type vulcanizing agents, peroxide-type vulcanizing agents, and bisphenol-type vulcanizing agents, more preferably at least one vulcanizing agent selected from the group consisting of thiourea-type vulcanizing agents, quinoxaline-type vulcanizing agents, and bisphenol-type vulcanizing agents, and particularly preferably a quinoxaline-type vulcanizing agents. These vulcanizing agents can be used singly or in the form of a mixture of two or more.

The rubber composition for vulcanization preferably contains 0.1 to 10 parts by mass, more preferably 0.5 to 5 parts by mass, of the vulcanizing agent (c5-1) based on 100 parts by mass of the epichlorohydrin rubber (c1-1). When the amount of the vulcanizing agent is less than 0.1 parts by mass, the crosslinking effect may be insufficient, and when it exceeds 10 parts by mass, a molded body obtained by molding the laminate of the present disclosure may be excessively rigid, and practical rubber properties may not be obtained.

In one preferable mode, the rubber composition for vulcanization further contains a peroxide-type vulcanizing agent in addition to at least one vulcanizing agent selected from the group consisting of thiourea-type vulcanizing agents, quinoxaline-type vulcanizing agents, and bisphenol-type vulcanizing agents. The peroxide-type vulcanizing agent is preferably dicumyl peroxide. The amount of the peroxide-type vulcanizing agent is preferably 1 part by mass or more and more preferably 2 parts by mass or more, and preferably 5 parts by mass or less, based on 100 parts by mass of the epichlorohydrin rubber (c1-1). For example, if the contents of the compound (c2-1) and the epoxy resin (c7) in the rubber composition for vulcanization are small, good adhesion may not be obtained; however, good adhesion to the layer (B) can be obtained by containing a peroxide-type vulcanizing agent even if the contents of the compound (c2-1) and the epoxy resin (c7) are small.

The rubber composition for vulcanization may further contain an acid acceptor. Examples of the acid acceptor include oxides, hydroxides, carbonic acid salts, carboxylic acid salts, silicic acid salts, boric acid salts, and phosphorus acid salts of the group (II) metals of the periodic table (provided that magnesium oxide is excluded), oxides, basic carbonic acid salts, basic carboxylic acid salts, basic phosphorus acid salts, and basic sulfurous acid salts of the group (IV) metals of the periodic table, synthetic hydrotalcites represented by the following general formula (2):

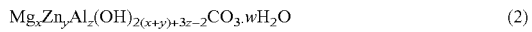  (2)

wherein x and y are a real number of 0 to 10, provided that x+y=1 to 10, z is a real number of 1 to 5, and w is a real number of 0 to 10, and Li—Al-type clathrate compounds represented by general formula (C):

[Al$_2$Li(OH)$_6$]$_n$X·mH$_2$O  (C)

wherein X is an inorganic or organic anion, n is the valence of the anion X, and m is 3 or less.

Specific examples of the acid acceptor include magnesium hydroxide, barium hydroxide, magnesium carbonate, barium carbonate, quick lime, slaked lime, calcium carbonate, calcium silicate, calcium stearate, zinc stearate, calcium phthalate, calcium phosphite, tin oxide, and basic tin phosphite.

Moreover, examples of the synthetic hydrotalcites represented by general formula (2) include Mg$_3$ZnAl$_2$(OH)$_{12}$CO$_3$·wH$_2$O. Also, the synthetic hydrotalcite may be a compound represented by the following general formula (D), which is encompassed within general formula (2):

  (D)

wherein x represents a real number of 1 to 10, z represents a real number of 1 to 5, and w represents a real number of 0 to 10. More specific examples include

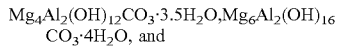

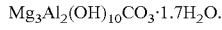

Moreover, examples of the Li—Al-type clathrate compounds represented by the general formula (C) may be

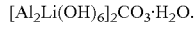

Examples of anionic species of the Li—Al-type clathrate compounds include carbonic acid, sulfuric acid, perchloric acid, oxyacid of phosphoric acid, acetic acid, propionic acid, adipic acid, benzoic acid, phthalic acid, terephthalic acid, maleic acid, fumaric acid, succinic acid, p-oxybenzoic acid, salicylic acid, and picric acid. These acid acceptors can be used singly or in the form of a mixture of two or more.

Among the acid acceptors, acid acceptors that are preferably used are metal oxides, metal hydroxides, and inorganic microporous crystals, in view of the heat resistance of epihalohydrin-based rubber. These acid acceptors are contained in such a range of amount that adhesion to the layer (B) is not impaired.

Preferably, the rubber composition for vulcanization does not contain an amine compound because the amine compound may deteriorate vulcanization properties and impair rubber properties.

Also, the rubber composition for vulcanization preferably contains a water-carrying substance (c9).

The water-carrying substance (c9) is preferably at least one selected from a water-absorbed product and a water-containing product.

Examples of the water-absorbed product as the water-carrying substance (c9) include a water-absorbed product obtained when a polyether compound, a metal compound, or the like absorbs water. Water absorption by the compound occurs upon contact with water (for example, impregnation) and is not limited.

Examples of the polyether compound include polyethylene oxide and polyethylene glycol.

Examples of the metal compound include oxides, hydroxides, carbonates, hydrochlorides, sulfides, sulfates, silicates, and synthetic hydrotalcites of metals.

Examples of the metal hydroxides include aluminum hydroxide, magnesium hydroxide, calcium hydroxide, barium hydroxide, zinc hydroxide, iron hydroxide, copper hydroxide, and manganese hydroxide.

Examples of the metal oxides include aluminum oxide, calcium oxide, magnesium oxide, titanium oxide, and copper oxide.

Examples of the metal carbonates include aluminum carbonate, calcium carbonate, magnesium carbonate, barium carbonate, and copper carbonate.

Examples of the metal hydrochlorides include aluminum chloride, calcium chloride, magnesium chloride, and copper chloride.

Examples of the metal sulfides include zinc sulfide, calcium sulfide, magnesium sulfide, copper sulfide, and zinc sulfide.

Examples of the metal sulfates include calcium sulfate, barium sulfate, aluminum sulfate, sodium sulfate, and copper sulfate.

Examples of the metal silicates include aluminum silicate, calcium silicate, magnesium silicate, sodium silicate, and copper silicate.

In view of increasing adhesion, the water-absorbed product as the water-carrying substance (c9) is preferably a compound having an absorbed-water retention of 5% by mass or more. More preferably, it is a compound having an absorbed-water retention of 10% by mass or more. The absorbed-water retention is the proportion of the amount of water retained by the water-absorbed product, and is calculated as follows.

Absorbed-water retention (% by mass)=(Amount (mass) of water retained by water-absorbed product)/Water-absorbed product(mass))×100

An example of the water-containing product as the water-carrying substance (c9) is a metal salt hydrate.

Examples of the metal salt hydrate include inorganic acid salt hydrates of silicic acid, boric acid, phosphoric acid, hydrochloric acid, hydrogen sulfide, sulfuric acid, nitric acid, and carbonic acid, and organic acid salt hydrates of carboxylic acids such as benzoic acid, phthalic acid, maleic acid, succinic acid, salicylic acid, and citric acid, with metals such as calcium, aluminum, zinc, manganese, lanthanum, titanium, zirconium, iron, cobalt, nickel, magnesium, and copper. Preferably, the metal salt hydrate is a hydrate of a metal salt selected from calcium acetate, aluminum sulfate, sodium sulfate, calcium sulfate, magnesium sulfate, zinc sulfate, manganese sulfate, copper sulfate, lanthanum sulfate, titanium sulfate, zirconium sulfate, iron sulfate, cobalt sulfate, and nickel sulfate, preferably a hydrate of a sulfuric acid salt and/or an acetic acid salt of a metal selected from calcium, magnesium, sodium, and copper, more preferably a calcium sulfate dihydrate, a sodium sulfate decahydrate, or a copper (II) sulfate pentahydrate, and particularly preferably a calcium sulfate dihydrate or a sodium sulfate decahydrate.

The content of the water-carrying substance (c9) is 0.1 to 80 parts by mass, preferably 0.5 to 70 parts by mass, more preferably 1 to 50 parts by mass, and particularly preferably 1 to 20 parts by mass based on 100 parts by mass of the epichlorohydrin rubber (c1-1). A content within these ranges is preferable because a sufficient adhesive effect is obtained without impairing the mechanical properties of the vulcanized product.

The rubber composition for vulcanization may contain a copper salt.

The copper salt is preferably an organic copper salt. Examples of the organic copper salt include copper salts of saturated carboxylic acids such as formic acid, acetic acid, butyric acid, and stearic acid, copper salts of unsaturated carboxylic acids such as oleic acid and linoleic acid, copper salts of aromatic carboxylic acids such as salicylic acid, benzoic acid, and phthalic acid, copper salts of dicarboxylic acids such as oxalic acid, succinic acid, adipic acid, maleic acid, and fumaric acid, copper salts of hydroxy acids such as lactic acid and citric acid, a copper salt of carbamic acid, and copper salts of thiocarbamic acid and sulfonic acid such as copper dimethyldithiocarbamate, copper diethyldithiocarbamate, copper dibutyldithiocarbamate, copper N-ethyl-N-phenyldithiocarbamate, copper N-pentamethylene dithiocarbamate, and copper dibenzyldithiocarbamate. As organic copper salts, copper salts of saturated carboxylic acids, copper salts of unsaturated carboxylic acids, copper salts of aromatic carboxylic acids, and a copper salt of thiocarbamic acid are preferable, and copper stearate, copper dimethyldithiocarbamate, copper diethyldithiocarbamate, and copper dibutyldithiocarbamate are more preferable.

In view of increasing adhesion, the content of the copper salt is 0.01 to 5 parts by mass and preferably 0.05 to 3 parts by mass based on 100 parts by mass of the epichlorohydrin rubber (c1-1). More preferably 0.1 to 2 parts by mass. A content within these ranges is preferable because a sufficient adhesive effect is obtained without impairing the mechanical properties of the vulcanized product.

In order to impart to the layer (C) properties different from those of the epichlorohydrin rubber (c1-1), the rubber composition for vulcanization may contain a resin other than the epoxy resin. Examples of the resin include a polymethylmethacrylate (PMMA) resin, a polystyrene (PS) resin, a polyurethane (PUR) resin, a polyvinyl chloride (PVC) resin, an ethylene-vinyl acetate (EVA) resin, a styrene-acrylonitrile (AS) resin, a polyethylene (PE) resin, a chlorinated polystyrene, and a chlorosulfonated polyethylene. In this case, the content of the resin is preferably 1 to 50 parts by mass based on 100 parts by mass of the epichlorohydrin rubber (c1-1).

In the present disclosure, ordinary additives that are contained in commonly used rubber compositions for vulcanization can be contained according to the object or as necessary, including fillers, processing aids, plasticizers, softeners, anti-aging agents, colorants, stabilizers, adhesion aids, mold releasing agents, electroconductivity imparting agents, thermal conductivity imparting agents, anti-tackifiers for surfaces, tackifiers, flexibility imparting agents, heat resistance improvers, flame retarders, UV absorbers, oil resistance improvers, foaming agents, anti-scorching agents, lubricants, and like various additives. One or more commonly used vulcanizing agents and vulcanization accelerators that are different from the above may be added as well. However, these additives are added in such a range of amount that adhesion to the layer (B) is not impaired.

Examples of the fillers, the processing aids, and the plasticizers are the same as those described above.

The rubber composition for vulcanization is prepared by kneading the epichlorohydrin rubber (c1-1), the compound (c2-1), the magnesium oxide (c3-1), the silica (c4-1) and the epoxy resin (c7-1), and, moreover, as necessary, the zinc oxide (c8), the vulcanizing agent (c5-1), and other additives.

Kneading can be performed, for example, at a temperature of 150° C. or lower using an open roll, a Banbury mixer, a pressure kneader, or the like.

3-2. Non-Fluorinated Resin

Examples of the non-fluorinated resin include resins that have excellent mechanical strength and can primarily serve to maintain pressure resistance and the shape of a molded body (hereinafter referred to as structural member-type resins) such as a polyamide-based resin, a polyolefin-based resin, a vinyl chloride-based resin, a polyurethane resin, a polyester resin, a polyaramid resin, a polyimide resin, a polyamide-imide resin, a polyphenylene oxide resin, a polyacetal resin, a polycarbonate resin, an acryl-based resin, a styrene-based resin, an acrylonitrile/butadiene/styrene resin [ABS], a cellulose-based resin, a polyether ether ketone resin [PEEK], a polysulfone resin, a polyether sulfone resin [PES], and a polyetherimide resin; and resins having high permeation resistance to fuel and gas (hereinafter referred to as permeation resistant resins) such as a resin consisting of an ethylene/vinyl alcohol copolymer, a polyphenylene sulfide resin, a polybutylene naphthalate resin, a polybutylene terephthalate resin, and polyphthalamide [PPA].

As the non-fluorinated resin, in particular, a polyamide-based resin or a polyolefin-based resin is preferable, and a polyamide-based resin is more preferable.

The laminate of the present disclosure has excellent mechanical strength when the layer (C) contains the structural member-type resin, and the laminate of the present disclosure has excellent permeation resistance to fuel when the layer (C) contains the permeation resistant resin.

The polyamide-based resin is a polymer having an amide bond [—NH—C(=O)—] as a repeating unit within the molecule.

The polyamide-based resin may be any of a so-called nylon resin, which is a polymer in which an amide bond within the molecule is bonded to an aliphatic structure or an alicyclic structure, and a so-called aramid resin, which is a polymer in which an amide bond within the molecule is bonded to an aromatic structure.

The nylon resin is not limited, and examples include polymers such as nylon 6, nylon 66, nylon 11, nylon 12, nylon 610, nylon 612, nylon 6/66, nylon 66/12, nylon 46, a metaxylylenediamine/adipic acid copolymer, nylon 62, nylon 92, nylon 122 and nylon 142, and aromatic nylon such as nylon 6T and nylon 9T. Two or more of these may be used in combination.

The aramid resin is not limited, and examples include polyparaphenylene terephthalamide and polymetaphenylene isophthalamide.

The polyamide-based resin may be a polymer in which a structure without an amide bond as a repeating unit is block-copolymerized or graft-copolymerized with a part of the molecule. Examples of such polyamide-based resins include polyamide-based elastomers such as a nylon 6/polyester copolymer, a nylon 6/polyether copolymer, a nylon 12/polyester copolymer, and a nylon 12/polyether copolymer. These polyamide-based elastomers are obtained by block copolymerization of a nylon oligomer and a polyester oligomer via an ester bond, or obtained by block copolymerization of a nylon oligomer and a polyether oligomer via an ether bond. Examples of the polyester oligomer include polycaprolactone and polyethylene adipate, and examples of the polyether oligomer include polyethylene glycol, polypropylene glycol, and polytetramethylene glycol. The polyamide-based elastomer is preferably a nylon 6/polytetramethylene glycol copolymer or a nylon 12/polytetramethylene glycol copolymer.

Preferably the polyamide-based resin is, in particular, nylon 6, nylon 66, nylon 11, nylon 12, nylon 610, nylon 612, nylon 62, nylon 6/66, nylon 66/12, a nylon 6/polyester copolymer, a nylon 6/polyether copolymer, a nylon 12/polyester copolymer, a nylon 12/polyether copolymer, or the like, in view of obtaining sufficient mechanical strength even when the layer formed of the polyamide-based resin is thin. Two or more of these may be used in combination.

The polyolefin-based resin is a resin having a monomer unit derived from a vinyl group-containing monomer that does not have a fluorine atom. The vinyl group-containing monomer that does not have a fluorine atom is not limited, and preferably has the above-described polar functional group in applications in which interlayer adhesion is required.

The polyolefin-based resin is not limited, and examples include polyolefins such as polyethylene, polypropylene, high-density polyolefin, and low-density polyolefin, and also modified polyolefins obtained by modifying the above polyolefins with maleic anhydride or the like, epoxy-modified polyolefins, and amine-modified polyolefins. Among these, high-density polyolefin is preferable.

The non-fluorinated resin may contain various additives, e.g., stabilizers such as heat stabilizers, reinforcing agents, fillers, UV absorbers, and pigments as long as the object of the present disclosure is not impaired. Such additives can increase the properties of the non-fluorinated resin, such as thermal stability, surface hardness, abrasion resistance, electrostatic properties, and weather resistance.

The amine value of the polyamide-based resin is preferably 10 to 80 (eq/$10^6$ g). When the amine value is within the above range, excellent interlayer adhesion can be obtained even in the case of coextrusion at a relatively low temperature. When the amine value is less than 10 (eq/$10^6$ g), interlayer adhesion may be insufficient. When the amine value exceeds 80 (eq/$10^6$ g), the mechanical strength of the obtained laminate is insufficient, and coloration likely occurs during storage, resulting in poor handleability. A more preferable lower limit is 15 (eq/$10^6$ g) and an even more preferable lower limit is 23 (eq/$10^6$ g), and a more preferable upper limit is 60 (eq/$10^6$ g) and an even more preferable upper limit is 50 (eq/$10^6$ g).

In the present disclosure, the amine value is a value obtained by thermally dissolving 1 g of a polyamide-based resin in 50 ml of m-cresol and titrating this solution with 1/10 N aqueous p-toluenesulfonic acid solution using thymol blue as an indicator. The amine value means the amine value of the polyamide-based resin before laminating unless specified otherwise. Among the amino groups of the polyamide-based resin before laminatinng, some are considered to be consumed for adhesion to the adjacent layer; however, since the amount of consumed amino groups is very small relative to the entire layer, the amine value of the polyamide-based resin before laminating and the amine value of the laminate of the present disclosure are substantially comparable.

The non-fluorinated resin preferably has a melting point of 50 to 400° C. The lower limit is more preferably 100° C. and even more preferably 150° C. The upper limit is more preferably 300° C. and even more preferably 250° C.

The melting point is a value obtained as a temperature corresponding to the maximum value in the heat-of-fusion curve when the temperature is raised at a rate of 10° C./min using a differential scanning calorimeter (DSC) (manufactured by Seiko Instruments Inc.).

4. Laminate

The laminate of the present disclosure preferably has an interlayer initial adhesive strength of 5 N/cm or more between all layers. When the interlayer initial adhesive strength is 5 N/cm or more, there are advantages that a positional shift unlikely occurs when a tube is vulcanized in a particular shape, and that peeling does not occur when receiving an impact.

The above-described configuration enables the laminate of the present disclosure to have an interlayer initial adhesive strength within the above range. The interlayer initial adhesive strength is more preferably 10 N/cm or more and even more preferably 15 N/cm or more.

The interlayer initial adhesive strength is a value obtained by performing a delamination test at 25° C. at a tensile rate of 50 mm/min, measuring the adhesive strength, and calculating the average value of the data obtained (N=3), in accordance with JIS-K-6256 (an adhesion test method for vulcanized rubber).

In the laminate of the present disclosure, the boundary between the layers that are in contact does not necessarily need to be clear, and the laminate may have a layer structure having a concentration gradient in which the molecular chains of the polymers forming the respective layers mutually enter the layers from the surfaces in contact with each other.

One preferable embodiment of the laminate of the present disclosure is a laminate having the layer (A), the layer (B), and the layer (C), wherein the perfluororesin is a TFE/PAVE copolymer, the polymer having a CTFE unit has a reactive functional group, and the non-fluorinated polymer is a non-fluorinated elastomer. According to this embodiment, provided is a laminate wherein the layer (A) and the layer (B) as well as the layer (B) and the layer (C) are firmly adhered, which provides excellent fuel resistance and chemical solution resistance and, at the same time, excellent fuel barrier properties and moisture barrier properties, and yet the contact angle of the layer (A) serving as the outermost surface is large. Moreover, according to this embodiment, a laminate having excellent flexibility is provided.

One preferable embodiment of the laminate of the present disclosure is a laminate having the layer (A), the layer (B), and the layer (C), wherein the perfluororesin is a TFE/HFP copolymer, the polymer having a CTFE unit has a reactive functional group, and the non-fluorinated polymer is a polyamide-based resin. According to this embodiment, provided is a laminate wherein the layer (A) and the layer (B) as well as the layer (B) and the layer (C) are firmly adhered, which provides excellent fuel resistance and chemical solution resistance and, at the same time, excellent fuel barrier properties and moisture barrier properties, and yet the contact angle of the layer (A) serving as the outermost surface is large. Moreover, according to this embodiment, a laminate having excellent strength, high toughness, and even low oxygen permeability is provided.

The laminate of the present disclosure may have another layer. The thickness, shape, and the like of each layer of the laminate of the present disclosure may be suitably selected according to the purpose of use, the situation of use, and the like.

Examples of the method for producing the laminate of the present disclosure include:

(1) a method involving forming a laminate having a multilayer structure in one step by coextruding the polymers that form the respective layers to thermally fuse (melt-adhere) the layers (coextrusion molding);

(2) a method involving laminating the layers that are separately prepared by an extruder and adhering the layers by thermal fusion;

(3) a method involving forming a laminate by extruding by an extruder, onto the surface of a layer prepared in advance, a polymer that forms a layer to be adjacent to the aforementioned layer; and (4) a method involving electrostatically coating the surface of a layer prepared in advance with a polymer that forms a layer to be adjacent to the aforementioned layer, and then heating the resulting coated product entirely or from the coated side to thermally melt the polymer subjected to coating, to thereby form a layer.

When the laminate of the present disclosure is a tube or a hose, a method corresponding to the above (2) is (2a) a method involving separately forming each cylindrical layer by an extruder and coating the layer to be an inner layer with the other layer as a heat-shrinkable tube to be in contact with the inner layer; a method corresponding to the above (3) is (3a) a method involving, first, forming a layer to be an inner layer by an inner-layer extruder and forming a layer that is to be in contact with the aforementioned layer on the outer circumferential surface thereof by an outer-layer extruder; and a method corresponding to the above (4) is (4a) a method involving electrostatically applying a polymer for forming an inner layer to the inside of a layer to be in contact with the inner layer, and then placing the resulting coated product in a heating oven to heat the coated product entirely or inserting a rod-shaped heating device into the cylindrical coated product to heat the cylindrical coated product from inside, to thereby thermally melting and molding the polymer for the inner layer.

As long as each layer of the laminate of the present disclosure can be coextruded, the laminate is generally formed by the coextrusion molding of the above (1). Examples of the coextrusion molding include conventionally known multi-layer coextrusion production methods such as a multi-manifold method and a feed block method.

In the molding methods (2) and (3) above, after each layer is formed, the surface of each layer that comes into contact with another layer may be surface-treated in order to increase interlayer adhesion. Examples of such surface treatment include etching treatment such as sodium etching treatment; corona treatment; and plasma treatment such as low-temperature plasma treatment.

As a method for molding the laminate of the present disclosure, it is also possible to use a molding method involving laminating a plurality of materials in multiple stages by rotational molding. In this case, the melting point of the outer-layer material does not necessarily need to be higher than the melting point of the inner-layer material, and the melting point of the inner-layer material may be 100° C. or more higher than the melting point of the outer-layer material. In this case, preferably there is also a heating part inside.

When the laminate of the present disclosure has the layer (C) that contains a non-fluorinated elastomer, the non-fluorinated elastomer may be unvulcanized, and vulcanizing an unvulcanized laminate having the layer (A), the layer (B), and the layer (C) yields firm interlayer adhesion.

For vulcanization treatment, vulcanization methods and conditions for conventionally known rubber compositions for vulcanization can be employed. For example, there are a method involving vulcanizing an unvulcanized laminate for a long period of time, and a method involving heat-treating an unvulcanized laminate as a pretreatment for a relatively short period of time (vulcanization also occurs) and then performing vulcanization for a long period of time. Among these, the method involving heat-treating an unvulcanized laminate as a pretreatment for a relatively short period of time and then performing vulcanization for a long period of time is preferable because adhesion between the layers can be easily obtained. Also, in this method, the layer (C) is already vulcanized by the pretreatment, and the shape is thus stabilized, thereby enabling various methods for retaining the laminate to be selected in subsequent vulcanization.

The conditions of vulcanization treatment are not limited, and the vulcanization treatment can be performed under commonly used conditions. The treatment is preferably performed at 130 to 260° C. for 10 minutes to 80 hours using steam, a press, an oven, an air bath, infrared rays, microwaves, lead vulcanization, or the like. More preferably, the treatment is performed at 160 to 230° C. for 20 minutes to 80 hours.

The heating conditions of the pretreatment are also not limited, and the treatment is preferably performed at 100 to 170° C. for 30 seconds to 1 hour using steam, a press, an oven, an air bath, infrared rays, microwaves, lead vulcanization, or the like.

When the laminate of the present disclosure has the layer (C) containing a non-fluorinated resin, an example of a particularly preferable production method is a method involving coextruding in a molten state a perfluororesin for forming the layer (A), a polymer having a CTFE unit for forming the layer (B), and a non-fluorinated resin for forming the layer (C) to thus produce a laminate having the layer (A), the layer (B), and the layer (C).

When the laminate of the present disclosure has the layer (C) containing a non-fluorinated elastomer, an example of a particularly preferable production method is a method involving coextruding in a molten state a perfluororesin for forming the layer (A) and a polymer having a CTFE unit for forming the layer (B) to produce a laminate having the layer (A) and the layer (B) and then extruding a rubber composition for vulcanization containing the unvulcanized non-fluorinated elastomer (c1) for forming the layer (C) onto the layer (B) of the laminate using an extruder to thereby produce a laminate having the layer (A), the layer (B), and the layer (C). After forming the layer (C), the laminate having the layer (A), the layer (B), and the layer (C) may be vulcanized. According to this production method, a laminate in which the layers are firmly adhered can be produced without deteriorating the non-fluorinated elastomer for forming the layer (C) even when the layer (A) contains a TFE/PAVE copolymer that has a high melting point.

The laminate of the present disclosure can have various shapes such as a film shape, a sheet shape, a tube shape, a hose shape, a bottle shape, and a tank shape. The film shape, the sheet shape, the tube shape, and the hose shape may have a wavy shape, a corrugated shape, a convoluted shape, or the like.

When the laminate of the present disclosure is a tube or a hose, the laminate preferably has the layer (A) as the innermost layer, the layer (B) as the intermediate layer, and the layer (C) as the outermost layer because the excellent properties of the laminate of the present disclosure are likely exhibited.

When the laminate of the present disclosure is a tube or a hose that has a region in which a plurality of annular ridges and grooves in such a wavy form are provided, one side of the annulus can be compressed and the other side can be expanded outward in that region, which enables ease of bending the laminate by a desired angle without causing stress fatigue or interlayer delamination.

The method of forming the wavy region is not limited, and the wavy region can be easily formed by first creating a straight tube and then, for example, mold-shaping the tube into a predetermined wavy shape or the like.

The laminate of the present disclosure can be used in the following applications.

Films and sheets: such as food films, food sheets, chemical films, chemical sheets, diaphragms of diaphragm pumps, and various packings, tubes and hoses: such as chemical solution tubes or chemical solution hoses, coating material tubes or coating material hoses (including printer applications), fuel tubes or fuel hoses such as automobile fuel tubes or automobile fuel hoses, solvent tubes or solvent hoses, automobile radiator hoses, air conditioner hoses, brake hoses, wire claddings, food and beverage tubes or food and beverage hoses, underground tubes or hoses for gas stations, and submarine oil field tubes or hoses (including injection tubes and crude oil transfer tubes), bottles, containers, and tanks: such as automobile radiator tanks, fuel tanks such as gasoline tanks, solvent tanks, coating material tanks, chemical solution containers such as semiconductor chemical solution containers, and food and beverage tanks, and others: such as various automobile seals such as carburetor flange gaskets and fuel pump O-rings, various machine-related seals such as hydraulic equipment seals, gears, medical tubes (including catheters), and cableway pipes.

Embodiments have been described above, but it will be understood that various changes in forms and details can be made without departing from the gist and the scope of the claims.

EXAMPLES

Next, embodiments of the present disclosure will now be described by way of Examples, but the present disclosure is not limited solely to the Examples.

The numerical values of the Examples were measured by the following methods.

<Composition of Polymer>

The composition was measured by $^{19}$F-NMR assay.

<Melting Point>

Using a Seiko DSC apparatus, the melting peak when the temperature was raised at a rate of 10° C./min was recorded, and the temperature corresponding to the maximum value was regarded as the melting point.

<Melt Flow Rate (MFR)>

Using a melt indexer (manufactured by Toyo Seiki Seisaku-sho, Ltd.), the mass (g) of a polymer flowing out in unit time (10 minutes) from a nozzle having an inner diameter of 2 mm and a length of 8 mm was measured.

<Measurement of Number of Carbonate Groups>

A polymer containing a CTFE unit was compression-molded to form a film having a thickness of 50 to 200 μm. In an infrared absorption spectrum analysis of this film, a peak assigned to the carbonyl group of a carbonate group [—OC(=O)O—] appears at an absorption wavelength of 1817 cm$^{-1}$ [ν(C=O)], and thus the absorbance of the ν(C=O) peak was measured. The number of carbonate groups per $10^6$ carbon atoms in the main-chain of the polymer was calculated according to the following formula.

Number of end groups (per $1 \times 10^6$ carbon atoms)= $(1 \times K)/t$ l: Absorbance
K: Correction factor (—OC(=O)O—R: 1426)
t: Film thickness (mm)

<Water Contact Angle>

The water contact angle was measured with a water contact angle meter CA-A manufactured by Kyowa Interface Science Co., Ltd.

<Alcohol-Containing Fuel Permeability Coefficient>

The tubes produced in the Examples and Comparative Examples were cut to have a length of 40 cm, and the cut tube was attached to a SUS316 reservoir tank having a capacity of 120 ml with a swagelok. The amount of permeated CE10 (fuel obtained by adding 10% by volume of ethanol to a mixture of isooctane and toluene having a volume ratio of 50:50) at 60° C. was measured in accordance with SAE J1737, and the fuel permeability coefficient (g/m$^2$/day) was calculated from the thickness of the tubes.

<Moisture Permeability Coefficient>

The polymers for forming the respective layers of the tubes produced in the Examples and Comparative Examples were each placed in a metal mold, set in a press heated to a predetermined temperature, and melt-pressed at a predetermined pressure to produce sheets having the same thicknesses as the layers of the tubes produced in the Examples and Comparative Examples. The sheets were laminated so as to have the same layer arrangement as the tubes produced in the Examples and Comparative Examples, placed in a metal mold such that the laminated sheet to be obtained will have a thickness of 1 mm, and pressed to give laminated sheets.

Moreover, in Example 1 and Comparative Example 1, the resulting laminated sheets were steam-vulcanized using a vulcanizer can.

Each laminated sheet produced was cut to have a size of 100 mm×100 mm, and the water vapor permeation coefficient ($g/m^2$/day) of the laminated film was measured using a water vapor permeability tester L80-5000 manufactured by Dr. Lyssy in accordance with JIS K 7129 (A method). The side on which steam directly contacts is the layer (A) or the inner layer, and the dry air side is the layer (C) or the outer layer.

<Interlayer Adhesion>

The tubes produced in the Examples and Comparative Examples were subjected to a delamination test at 25° C. at a tensile rate of 50 mm/min in accordance with JIS-K-6256 (adhesion test method for vulcanized rubber) to observe the delamination mode, and evaluations were made according to the following criteria.

Good: Material fracture occurred at interface of laminate, and delamination at interface was not possible.

Poor: Delamination was possible at interface of laminate, and delamination strength at interface was less than 5 N/cm.

The following materials were used in the Examples and Comparative Examples.

TFE/PPVE copolymer: Melting point=304° C., MFR=2 g/10 min (372° C., 5 kg)

CTFE/TFE/PPVE copolymer 1: TFE/CTFE/PPVE (molar ratio)=76.3/21.3/2.4, melting point=245° C., MFR=3 g/10 min (297° C., 5 kg), number of carbonate groups=70

CTFE/TFE/PPVE copolymer 2: TFE/CTFE/PPVE (molar ratio)=76.3/21.3/2.4, melting point=245° C., MFR=30 g/10 min (297° C., 5 kg), and number of carbonate groups=180

NBR: Acrylonitrile-butadiene rubber, trade name Nipol DN101, manufactured by Zeon Corporation TFE/HFP copolymer: Melting point=260° C., MFR=40 g/10 min (372° C., 5 kg)

Polyamide 12 (nylon 12): Vestamid X7297, manufactured by Degussa Huls AG

Ethylene/TFE copolymer: Melting point=225° C., MFR=30 g/10 min (297° C., 5 kg)

Example 1

Using a two-component two-layer tube extrusion apparatus equipped with a multimanifold (manufactured by PLABOR Research Laboratory of Plastics Technology Co., Ltd.), a TFE/PPVE copolymer as a layer (A) and a CTFE/TFE/PPVE copolymer 1 as a layer (B) were fed to two extruders, respectively, to mold a two-component two-layer multilayer tube. Next, the obtained multilayer tube was coated with NBR, and thus a three-component three-layer unvulcanized multilayer tube was obtained. The obtained unvulcanized laminated tube was steam-vulcanized using a vulcanizer can, and thus a three-component three-layer multilayer tube wherein the layer (C) was vulcanized was obtained. The obtained multilayer tube had an outer diameter of 8 mm and an inner diameter of 6 mm. Concerning the thickness of each layer of the obtained multilayer tube, the layer (A) was 0.1 mm, the layer (B) was 0.1 mm, and the layer (C) was 0.8 mm. Also, on the obtained multilayer tube (or a laminated sheet obtained by the method described above), the water contact angle of the layer (A), the alcohol-containing fuel permeability coefficient, and the moisture permeability coefficient were measured, and interlayer adhesion was evaluated. The results are shown in Table 2.

Example 2

Using a three-component three-layer tube extrusion apparatus equipped with a multimanifold (manufactured by PLABOR Research Laboratory of Plastics Technology Co., Ltd.), a TFE/HFP copolymer as a layer (A), a CTFE/TFE/PPVE copolymer 2 as a layer (B), and polyamide 12 as a layer (C) were fed to three extruders, respectively, to mold a three-component three-layer multilayer tube. The obtained multilayer tube had an outer diameter of 8 mm and an inner diameter of 6 mm. Concerning the thickness of each layer of the obtained multilayer tube, the layer (A) was 0.1 mm, the layer (B) was 0.1 mm, and the layer (C) was 0.8 mm. The obtained multilayer tube (or a laminated sheet obtained by the method described above) was evaluated in the same manner as in Example 1. The results are shown in Table 2.

Example 3

Using a two-component two-layer tube extrusion apparatus equipped with a multimanifold (manufactured by PLABOR Research Laboratory of Plastics Technology Co., Ltd.), a TFE/HFP copolymer as a layer (A) and a CTFE/TFE/PPVE copolymer 2 as a layer (B) were fed to two extruders, respectively, to mold a two-component two-layer multilayer tube. Next, the obtained multilayer tube was coated with NBR, and thus a three-component three-layer unvulcanized multilayer tube was obtained. The obtained unvulcanized laminated tube was steam-vulcanized using a vulcanizer can, and thus a three-component three-layer multilayer tube wherein the layer (C) was vulcanized was obtained. The obtained multilayer tube had an outer diameter of 8 mm and an inner diameter of 6 mm. Concerning the thickness of each layer of the obtained multilayer tube, the layer (A) was 0.1 mm, the layer (B) was 0.1 mm, and the layer (C) was 0.8 mm. Also, on the obtained multilayer tube (or a laminated sheet obtained by the method described above), the water contact angle of the layer (A), the alcohol-containing fuel permeability coefficient, and the moisture permeability coefficient were measured, and interlayer adhesion was evaluated. The results are shown in Table 2.

Comparative Example 1

A tube extrusion apparatus (manufactured by PLABOR Research Laboratory of Plastics Technology Co., Ltd.) was used to mold a tube of a TFE/PPVE copolymer. The obtained TFE/PPVE copolymer tube was coated with NBR, and thus a two-component two-layer unvulcanized multilayer tube was obtained. The obtained unvulcanized laminated tube was steam-vulcanized using a vulcanizer can, and thus a two-component two-layer multilayer tube wherein NBR was vulcanized was obtained. The obtained multilayer tube had an outer diameter of 8 mm and an inner diameter of 6 mm. Concerning the thickness of each layer of the obtained multilayer tube, the inner layer (TFE/PPVE copolymer) was 0.2 mm, and the outer layer (NBR) was 0.8 mm. The obtained multilayer tube (or a laminated sheet obtained by the method described above) was evaluated in the same manner as in Example 1. The results are shown in Table 2.

Comparative Example 2

Using a two-component two-layer tube extrusion apparatus equipped with a multimanifold (manufactured by PLA- BOR Research Laboratory of Plastics Technology Co., Ltd.), an ethylene/TFE copolymer as the inner layer and polyamide 12 as the outer layer were fed to two extruders, respectively, to mold a two-component two-layer multilayer tube. The obtained multilayer tube had an outer diameter of 8 mm and an inner diameter of 6 mm. Concerning the thickness of each layer of the obtained multilayer tube, the inner layer (ethylene/TFE copolymer) was 0.2 mm, and the outer layer (polyamide) was 0.8 mm. The obtained multilayer tube (or a laminated sheet obtained by the method described above) was evaluated in the same manner as in Example 1. The results are shown in Table 2.

TABLE 2

|  | Water contact angle (degree) of inner layer of tube | Alcohol-containing fuel permeability coefficient (g/m$^2$/day) | Moisture permeability coefficient (g/m$^2$/day) | Interlayer adhesion |
|---|---|---|---|---|
| Example 1 | 115 | 2.9 | 5.2 | Good |
| Example 2 | 115 | 1.7 | 3.1 | Good |
| Example 3 | 115 | 1.7 | 3.1 | Good |
| Comparative Example 1 | 115 | 5.0 | 9.9 | Poor |
| Comparative Example 2 | 90 | 11.4 | 22.3 | Good |

The invention claimed is:

1. A laminate comprising:
   (A) a layer containing a perfluororesin,
   (B) a layer containing a polymer having a chlorotrifluoroethylene unit, and
   (C) a layer containing a non-fluorinated polymer,
   wherein the polymer having a chlorotrifluoroethylene unit contains a chlorotrifluoroethylene unit, a tetrafluoroethylene unit, and a monomer (α) unit derived from a monomer (α) copolymerizable therewith, and comprises 15 to 25 mol % of the chlorotrifluoroethylene unit and 85 to 75 mol % of the tetrafluoroethylene unit,
   wherein the layer (A), the layer (B), and the layer (C) are laminated in the following order: the layer (A) and the layer (B) are directly adhered, and the layer (B) and the layer (C) are directly adhered,
   wherein the perfluororesin is a tetrafluoroethylene/perfluoro(alkyl vinyl ether) copolymer, the polymer having a chlorotrifluoroethylene unit has a reactive functional group, and the non-fluorinated polymer is a non-fluorinated elastomer,
   wherein the melting point of the tetrafluoroethylene/perfluoro(alkyl vinyl ether) copolymer is 290 to 310° C., and the melt flow rate of the tetrafluoroethylene/perfluoro(alkyl vinyl ether) copolymer is 1 to 50 g/10 min.

2. The laminate according to claim 1, wherein a ratio of a melt flow rate (a) of the perfluororesin to a melt flow rate (b) of the polymer having a chlorotrifluoroethylene unit, a/b, is 0.3 to 3.3.

3. A tube comprising the laminate according to claim 1.

4. A laminate comprising:
   (A) a layer containing a perfluororesin,
   (B) a layer containing a polymer having a chlorotrifluoroethylene unit, and
   (C) a layer containing a non-fluorinated polymer,
   wherein the polymer having a chlorotrifluoroethylene unit contains a chlorotrifluoroethylene unit, a tetrafluoroethylene unit, and a monomer (α) unit derived from a monomer (α) copolymerizable therewith, and comprises 15 to 25 mol % of the chlorotrifluoroethylene unit and 85 to 75 mol % of the tetrafluoroethylene unit,
   wherein the layer (A), the layer (B), and the layer (C) are laminated in the following order: the layer (A) and the layer (B) are directly adhered, and the layer (B) and the layer (C) are directly adhered,
   wherein the perfluororesin is a tetrafluoroethylene/hexafluoropropylene copolymer, the polymer having a chlorotrifluoroethylene unit has a reactive functional group, and the non-fluorinated polymer is a polyamide-based resin,
   wherein the melting point of the tetrafluoroethylene/hexafluoropropylene copolymer is 240 to 290° C., and the melt flow rate of the tetrafluoroethylene/hexafluoropropylene copolymer is 10 to 50 g/10 min.

5. The laminate according to claim 4, wherein a ratio of a melt flow rate (a) of the perfluororesin to a melt flow rate (b) of the polymer having a chlorotrifluoroethylene unit, a/b, is 0.3 to 3.3.

6. A tube comprising the laminate according to claim 4.

* * * * *